US011388393B2

(12) United States Patent
Jeong et al.

(10) Patent No.: US 11,388,393 B2
(45) Date of Patent: *Jul. 12, 2022

(54) METHOD FOR ENCODING VIDEO INFORMATION AND METHOD FOR DECODING VIDEO INFORMATION, AND APPARATUS USING SAME

(71) Applicants: Electronics and Telecommunications Research Institute, Daejeon (KR); University-Industry Cooperation Group of Kyung Hee University, Yongin-si (KR)

(72) Inventors: Se Yoon Jeong, Daejeon-si (KR); Hui Yong Kim, Daejeon-si (KR); Sung Chang Lim, Daejeon-si (KR); Jin Ho Lee, Daejeon-si (KR); Ha Hyun Lee, Seoul (KR); Jong Ho Kim, Daejeon-si (KR); Jin Soo Choi, Daejeon-si (KR); Jin Woong Kim, Daejeon-si (KR); Chie Teuk Ahn, Daejeon-si (KR); Gwang Hoon Park, Seongnam-si (KR); Kyung Yong Kim, Suwon-si (KR); Han Soo Lee, Yongin-si (KR); Tae Ryong Kim, Yongin-si (KR)

(73) Assignees: Electronics and Telecommunications Research Institute, Daejeon (KR); University-Industry Cooperation Group of Kyung Hee University, Yongin-si (KR)

(*) Notice: Subject to any disclaimer, the term of this patent is extended or adjusted under 35 U.S.C. 154(b) by 0 days.

This patent is subject to a terminal disclaimer.

(21) Appl. No.: 17/344,161

(22) Filed: Jun. 10, 2021

(65) Prior Publication Data
US 2021/0306622 A1    Sep. 30, 2021

Related U.S. Application Data

(63) Continuation of application No. 14/044,542, filed on Oct. 2, 2013, now Pat. No. 11,064,191, which is a
(Continued)

(30) Foreign Application Priority Data

Dec. 31, 2010  (KR) .................. 10-2010-0140721
Dec. 30, 2011  (KR) .................. 10-2011-0147083

(51) Int. Cl.
*H04N 19/10*     (2014.01)
*H04N 19/105*    (2014.01)
(Continued)

(52) U.S. Cl.
CPC .......... *H04N 19/10* (2014.11); *H04N 19/105* (2014.11); *H04N 19/136* (2014.11);
(Continued)

(58) Field of Classification Search
CPC .... H04N 19/10; H04N 19/105; H04N 19/136; H04N 19/197; H04N 19/196;
(Continued)

(56) References Cited

U.S. PATENT DOCUMENTS

2004/0066848 A1    4/2004  Jeon
2004/0150538 A1    8/2004  Kim
(Continued)

FOREIGN PATENT DOCUMENTS

KR    10-2008-0064355 A    7/2008
KR    10-2010-0033676 A    3/2010
WO    WO 2008/117933 A1    10/2008

OTHER PUBLICATIONS

International Search Report and Written Opinion of the International Searching Authority dated May 29, 2012, in counterpart International Application No. PCT/KR2011/010379 (14 pages, including English and Korean versions).
(Continued)

*Primary Examiner* — Mohammed S Rahaman
(74) *Attorney, Agent, or Firm* — Michael Best & Friedrich LLP

(57) ABSTRACT

A method for coding image information includes generating prediction information by predicting information on a cur-
(Continued)

rent coding unit, and determining whether the information on the current coding unit is the same as the prediction information. When the information on the current coding unit is the same as the prediction information, a flag indicating that the information on the current coding unit is the same as the prediction information is coded and transmitted. When the information on the current coding unit is not the same as the prediction information, a flag indicating that the information on the current coding unit is not the same as the prediction information and the information on the current coding unit are coded and transmitted. At the generating of the prediction information, the prediction information is generated by using the information on the coding unit neighboring to the current coding unit.

3 Claims, 28 Drawing Sheets

Related U.S. Application Data continuation of application No. 13/977,520, filed as application No. PCT/KR2011/010379 on Dec. 30, 2011, now Pat. No. 9,955,155.

(51) Int. Cl.
H04N 19/136 (2014.01)
H04N 19/196 (2014.01)
H04N 19/61 (2014.01)
H04N 19/46 (2014.01)

(52) U.S. Cl.
CPC ......... *H04N 19/197* (2014.11); *H04N 19/196* (2014.11); *H04N 19/46* (2014.11); *H04N 19/61* (2014.11)

(58) Field of Classification Search
CPC ...... H04N 19/46; H04N 19/61; H04N 19/176; H04N 19/50; H04N 19/513; H04N 19/70
See application file for complete search history.

(56) References Cited

U.S. PATENT DOCUMENTS

| | | |
|---|---|---|
| 2007/0053443 A1 | 3/2007 | Song |
| 2008/0107180 A1 | 5/2008 | Lee et al. |
| 2008/0240248 A1 | 10/2008 | Lee et al. |
| 2009/0003447 A1 | 1/2009 | Christoffersen et al. |
| 2009/0190655 A1 | 7/2009 | Shimada et al. |
| 2009/0290643 A1* | 11/2009 | Yang ............... H04N 19/61 375/240.16 |
| 2009/0296808 A1 | 12/2009 | Regunathan et al. |
| 2010/0098157 A1 | 4/2010 | Yang |
| 2010/0135399 A1 | 6/2010 | Rui |
| 2011/0038412 A1* | 2/2011 | Jung ............... H04N 19/593 375/240.12 |
| 2011/0038414 A1 | 2/2011 | Song et al. |
| 2011/0255600 A1 | 10/2011 | Lin et al. |
| 2011/0293008 A1 | 12/2011 | Suzuki |
| 2011/0310976 A1* | 12/2011 | Wang ............... H04N 19/46 375/240.24 |
| 2012/0140824 A1 | 6/2012 | Min et al. |
| 2013/0016782 A1 | 1/2013 | Sasai et al. |

OTHER PUBLICATIONS

Karczewicz et al. "Joint Collaborative Team on Video Coding (JCT-VC) of ITU-T SG16 WP3 and ISO/IEC JTC1/SC29/WG11 3$^{rd}$ Meeting: Guangzhou, CN, Oct. 7-15, 2010", Document JCTVC-C263 to.

To McCann et al. "Samsung's Response to the Call for Proposals on Video Compression Technology" Joint Collaborative Team on Video Coding (JCT-VC) of ITU-T SG16 WP3 and ISO/IEC JTC1/SC29/WG11 1$^{st}$ Meeting: Dresden, DE, Apr. 15-23, 2010.

Iain E. G. Richardson, 2003, "H.264 and MPEG-4 Video Compression Video Coding for Next-generation Multimedia" Book pp. 166-212.

A.M. Tourapis, Feng Wu and Shipeng Li, "Direct mode coding for bipredictive slices in the H.264 standard," in IEEE Transactions on Circuits and Systems for Video Technology, vol. 15, No. 1, pp. 119-126, Jan. 2005.

* cited by examiner

FIG. 10
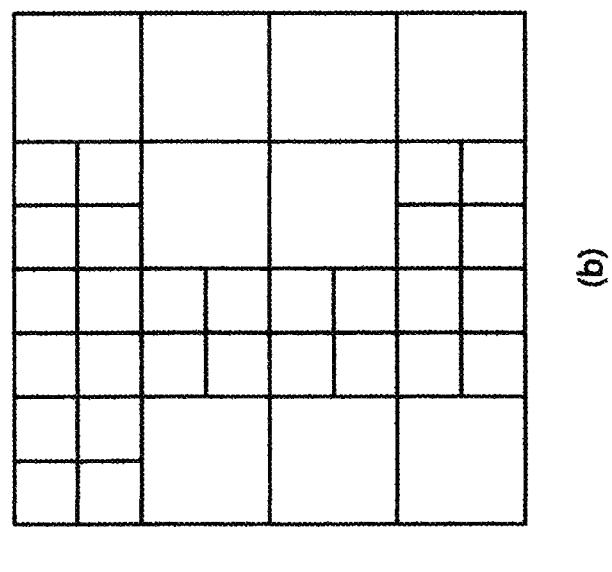
(b)
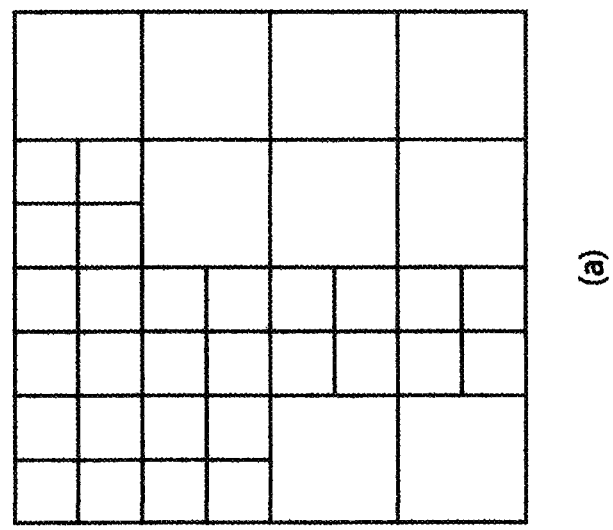
(a)

METHOD FOR ENCODING VIDEO INFORMATION AND METHOD FOR DECODING VIDEO INFORMATION, AND APPARATUS USING SAME

This application is a Continuation Application of U.S. patent application Ser. No. 14/044,542, filed on Oct. 2, 2013, which is a Continuation Application of U.S. patent application Ser. No. 13/977,520 having a 371(c) date of Jun. 28, 2013, which is a U.S. national stage application of International Application No. PCT/KR2011/010379 filed on Dec. 30, 2011. This application claims the benefit of Korean Application Nos. 10-2010-0140721 filed on Dec. 31, 2010, and 10-2011-0147083 filed on Dec. 30, 2011. The entire contents of application Ser. No. 13/977,520, International Application No. PCT/KR2011/010379, and Korean Application Nos. 10-2010-0140721 and 10-2011-0147083 are incorporated herein by reference for all purposes.

TECHNICAL FIELD

The present invention relates to a method and an apparatus for predicting and coding coding information in high efficiency video coding (HEVC).

BACKGROUND ART

Recently, a broadcast service having high definition (HD) resolution (1280×1024 or 1920×1080) has been expanded in the country and all over the world. Today, many users have been familiar with high-resolution and high-quality images.

Therefore, many organizations have been attempted to develop next-generation image devices. In addition, as the interest in ultra high definition (UHD) having a resolution four times higher than that of HDTV next to HDTV has been increased, moving picture standardization organizations have recognized the necessity for a compression technology for a higher-resolution and higher-definition video.

In connection with this, the next-generation image devices have required a new standard capable of acquiring many advantages in terms of a frequency band or storage while maintaining the same image quality using compression efficiency higher than that of H.264/AVC used for HDTV, mobile phones, Blue-ray player.

A moving picture experts group (MPEG) and a video coding experts group (VCEG) commonly standard high efficiency video coding (HEVC) that is a next-generation video codec and are to code images including an UHD image with compression efficiency twice higher than that of H.264/AVC. The next-generation video codec (HEVC) is to provide the high-quality image at a frequency lower than the current even in HD and UHD image and a 3D broadcast and mobile communication network.

The HEVC was adopted to measure standard performance of the codec named as Test Model Under Consideration (TMuC) through a contribution of each organization after Joint Collaboration Team Video Coding (JCT-VC) conference is first held in April, 2010.

Meanwhile, various technologies have been adopted so as to increase the coding/decoding efficiency in the HEVC. How to process the information necessary for prediction/conversion/quantization, or the like, so as to perform coding of the current CU is problematic.

DISCLOSURE

Technical Problem

The present invention provides a method and an apparatus for improving compression efficiency of coded information, in a high-efficiency moving picture coding/decoding technology.

The present invention also provides a method and an apparatus for coding/decoding information on coding unit by using neighbor information, in a high-efficiency moving picture coding/decoding technology.

The present invention also provides a method and an apparatus for coding/decoding information on coding unit by using neighbor information when the information on the coding unit is not the same as the neighbor information, in a high-efficiency moving picture coding/decoding technology.

The present invention also provides a method and an apparatus for removing redundancy of information between CUs by predicting and coding information on independently coded CUs by neighboring coding units within the same frame, a coding unit or a prediction structure within a reference frame, in a high-efficiency moving picture coding/decoding technology.

Technical Solution

In an aspect, there is provided a method for coding image information, including: generating prediction information by predicting information on a current coding unit; and determining whether the information on the current coding unit is the same as the prediction information, wherein when the information on the current coding unit is the same as the prediction information, a flag indicating that the information on the current coding unit is the same as the prediction information is coded and transmitted, and when the information on the current coding unit is not the same as the prediction information, the flag indicating that the information on the current coding unit is not the same as the prediction information and the information on the current coding unit are coded and transmitted, and at the generating of the prediction information, the prediction information is generated by using the information on the coding unit neighboring to the current coding unit.

The information on the coding unit neighboring to the current coding unit may be the information on the coding unit corresponding to the current coding unit within a reference frame.

The information on the coding unit neighboring to the current coding unit may be a split flag regarding the coding unit corresponding to the current coding unit within the reference frame, and the determining whether the information on the current coding unit is the same as the prediction information may determine whether the split flag regarding the current coding unit for each depth is not the same as the split information regarding the coding unit corresponding to the current coding unit within the reference frame.

The information on the coding unit neighboring to the current coding unit may be the information on the coding unit neighboring to the current coding unit within a frame to which the current coding unit belongs.

The information on the coding unit neighboring to the current coding unit may be the information on the prediction structure within the frame to which the current coding unit and the neighboring coding unit belong and the determining whether the information on the current coding unit is the same as the prediction information may determine that the information on the current coding unit is the same as the prediction information when the current coding unit performs inter-picture prediction by using two lists referring to two frames, respectively, that are temporally previous and subsequent and determine that the information on the current coding unit is not the same as the prediction information, when the current coding unit performs the inter-picture prediction without using two lists referring to two frames, respectively, that are temporally previous and subsequent.

When the information on the current coding unit is not the same as the prediction information, the list to be referred and a reference index may be coded and transmitted as the information on the current coding unit.

When the information on the current coding unit is not the same as the prediction information, a flag indicating that the information on the current coding unit is not the same as the prediction information and a difference between the information on the current coding unit and the prediction information may be coded and transmitted.

When the information on the current coding unit is not the same as the prediction information, a codeword may be generated excluding the prediction information from the coding information selected as the information on the current coding unit to code the information on the current coding unit.

When the information on the current coding unit is not the same as the prediction information, probability for the information on the current coding unit may be again generated based on the prediction information to code the information on the current coding unit.

In another aspect, there is provided a method for decoding image information, including: decoding a prediction flag indicating whether information on a current coding unit is the same as prediction information predicted from information on a coding unit neighboring to the current coding unit; and determining whether the information on the current coding unit is the same as the prediction information based on the decoded prediction flag, wherein when the information on the current coding unit is the same as the prediction information, the prediction information is used as the information on the current coding unit, and when the information on the current coding unit is not same as the prediction information, the information on the current coding unit is decoded.

The information on the coding unit neighboring to the current coding unit may be the information on the coding unit corresponding to the current coding unit within a reference frame.

The information on the coding unit neighboring to the current coding unit may be a split flag regarding the coding unit corresponding to the current coding unit within a reference frame.

The information on the coding unit neighboring to the current coding unit may be the information on the coding unit neighboring to the current coding unit within a frame to which the current coding unit belongs.

The information on the coding unit neighboring to the current coding unit may be the information on the prediction structure within the frame to which the current coding unit and the neighboring coding unit belong, and at the determining whether the information on the current coding unit is the same as the prediction information, when the information on the current coding unit is the same as the prediction information, inter-picture prediction may be performed by using two lists referring to two frames, respectively, that are temporally previous and subsequent for the frame to which the current coding unit belongs.

At the determining whether the information on the current coding unit is not the same as the prediction information, if it is determined that the information on the current coding unit is not the same as the prediction information, the inter-picture prediction may be performed based on a reference list and a reference index separately transmitted.

When the information on the current coding unit is not the same as the prediction information, the information on the current coding unit may be decoded based on the prediction information.

The difference between the prediction information and the information on the current coding unit may be decoded and a value added to the prediction information may be used as the information on the current coding unit.

The information on the current coding unit may be obtained by selecting any one of the candidate information excluding the prediction information from the candidate information selected as the information on the current coding unit.

Probability for the information on the current coding unit may be again generated based on the prediction information to decode the information on the current coding unit.

Advantageous Effects

As set forth above, the embodiments of the present invention can improve the coding efficiency for the information on the coding unit in the high-efficiency video coding/decoding technology.

The embodiments of the present invention can remove the redundancy of information between the CUs by predicting and coding the information on independently coded CUs by the neighboring coding unit within the same frame, the coding unit or the prediction structure within the reference frame, when the image is coded in the coding unit (CU) unit in the high-efficiency video picture coding/decoding technology.

The embodiments of the present invention can code and decode the information on the current coding unit by using the neighboring information in the high-efficiency video coding/decoding technology.

DESCRIPTION OF DRAWINGS

FIG. 10 is a diagram schematically explaining a method for transmitting split flag.

MODE FOR INVENTION

Hereinafter, exemplary embodiments of the present invention will be described in detail with reference to the accompanying drawings. In describing exemplary embodiments of the present invention, well-known functions or constructions will not be described in detail since they may unnecessarily obscure the understanding of the present invention.

It will be understood that when an element is simply referred to as being 'connected to' or 'coupled to' another element without being 'directly connected to' or 'directly coupled to' another element in the present description, it may be 'directly connected to' or 'directly coupled to' another element or be connected to or coupled to another element, having the other element intervening therebetween. Further, in the present invention, "comprising" a specific configuration will be understood that additional configuration may also be included in the embodiments or the scope of the technical idea of the present invention.

Terms used in the specification, 'first', 'second', etc. can be used to describe various components, but the components are not to be construed as being limited to the terms. The terms are only used to differentiate one component from other components. For example, the 'first' component may be named the 'second' component without being departed from the scope of the present invention and the 'second' component may also be similarly named the 'first' component.

Furthermore, constitutional parts shown in the embodiments of the present invention are independently shown so as to represent characteristic functions different from each other. Thus, it does not mean that each constitutional part is constituted in a constitutional unit of separated hardware or software. In other words, each constitutional part includes each of enumerated constitutional parts for convenience. Thus, at least two constitutional parts of each constitutional part may be combined to form one constitutional part or one constitutional part may be divided into a plurality of constitutional parts to perform each function. The embodiment where each constitutional part is combined and the embodiment where one constitutional part is divided are also included in the scope of the present invention, if not departing from the essence of the present invention.

In addition, some of constituents may not be indispensable constituents performing essential functions of the present invention but be selective constituents improving only performance thereof. The present invention may be implemented by including only the indispensable constitutional parts for implementing the essence of the present invention except the constituents used in improving performance. The structure including only the indispensable constituents except the selective constituents used in improving only performance is also included in the scope of the present invention.

Figure 1:
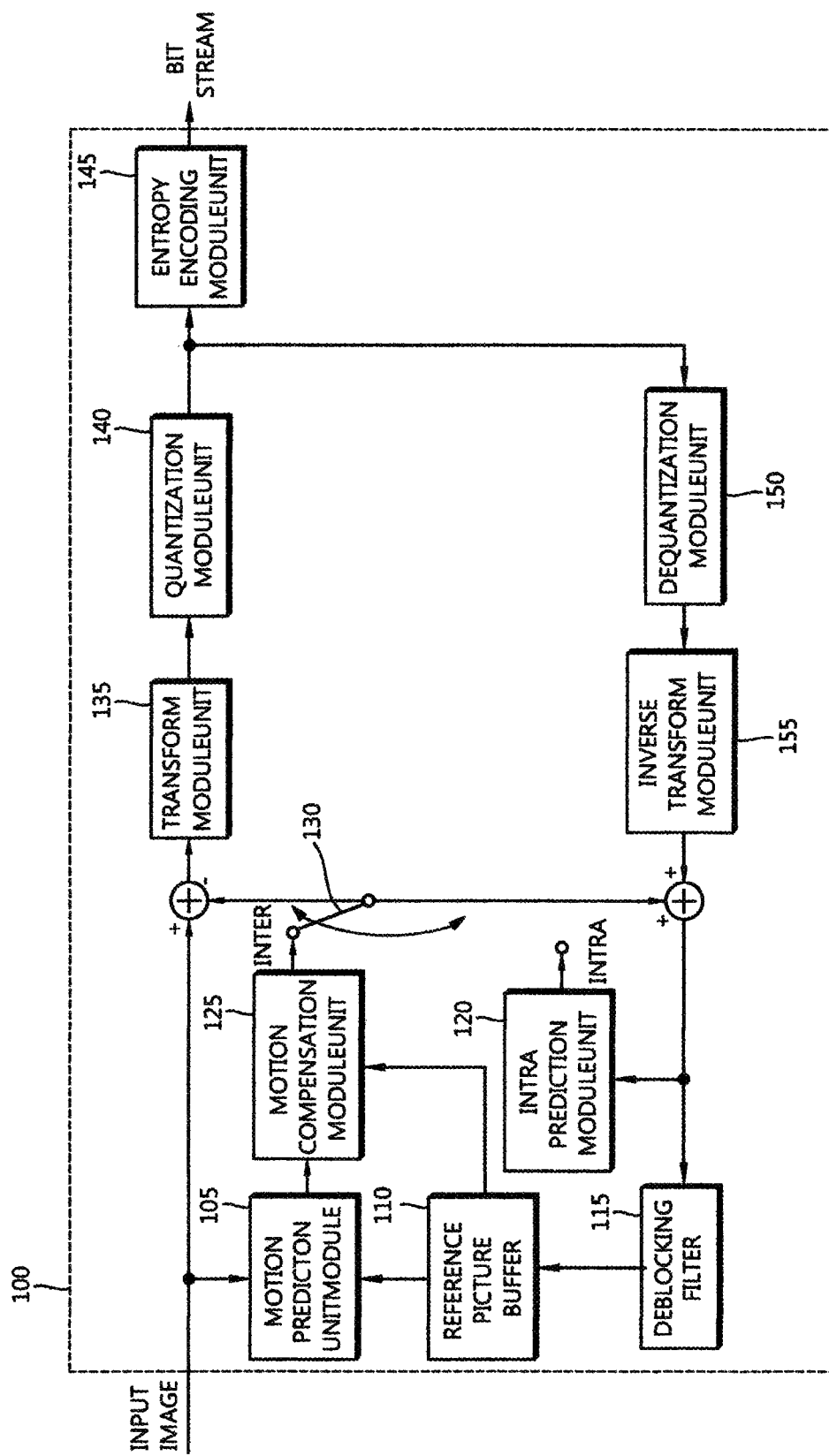
FIG. 1 is a diagram schematically showing an example of a coder structure.

FIG. 1 is a diagram schematically showing an example of a coder structure. A coder 100 of FIG. 1 may be a coder supporting high efficiency video coding.

Referring to FIG. 1, a coder 100 receives images and codes the received images by an intra mode or an inter mode to output a bitstream. When the coding is performed using the intra mode, a switch 130 is switched to an intra and when the coding is performed using the inter mode, the switch 130 is switched to an inter mode.

A main flow of a coding process performed in the coder generates a prediction block for a block of the input images and then, obtains a difference between the block of the input images and the prediction block, thereby performing the coding.

The generation of the prediction block is performed according to the intra mode and the inter mode. In the case of the intra mode, the prediction block is generated by allowing an intra prediction module 120 to perform spatial prediction by using already coded neighboring pixel values of the current block. In the case of the inter mode, a motion prediction module 105 searches a region that is optimally matched with the current input block in the reference picture stored in a reference picture buffer 110 to obtain a motion vector. A motion compensator 125 may perform motion compensation by using a motion vector to generate the prediction block.

As described above, a subtractor 160 obtains the difference between the current block and the prediction block to generate a residual block. The coding for the residual block is performed in order such as transform in a transform module 135, quantization in a quantization module 140, entropy coding in an entropy encoding module 145 or the like.

The transform module 135 receives the residual block to perform transform and outputs transform coefficients. Further, the quantizing module 140 quantizes the transform coefficients according to quantization parameters to output the quantized coefficients. Then, the entropy encoding module 145 performs the entropy coding on the quantized coefficients according to probability distribution and outputs the entropy coded coefficients as the bitstream.

In inter-frame prediction coding, the currently coded images may be used as the reference picture of subsequently input images. Therefore, there is a need to decode and store the currently coded images. The quantized coefficients are dequantized and inversely transformed by passing through a dequantization module 150 and an inverse transform module 155.

As shown, the residual block passing through the dequantization and the inverse transform is resynthesized with the prediction image by an adder 165 to generate a reconstructed block. A deblocking filter 115 removes a blocking artifact of the reconstructed block generated during the coding process and the reference picture buffer 110 stores a deblocked reconstructed image.

Figure 2:
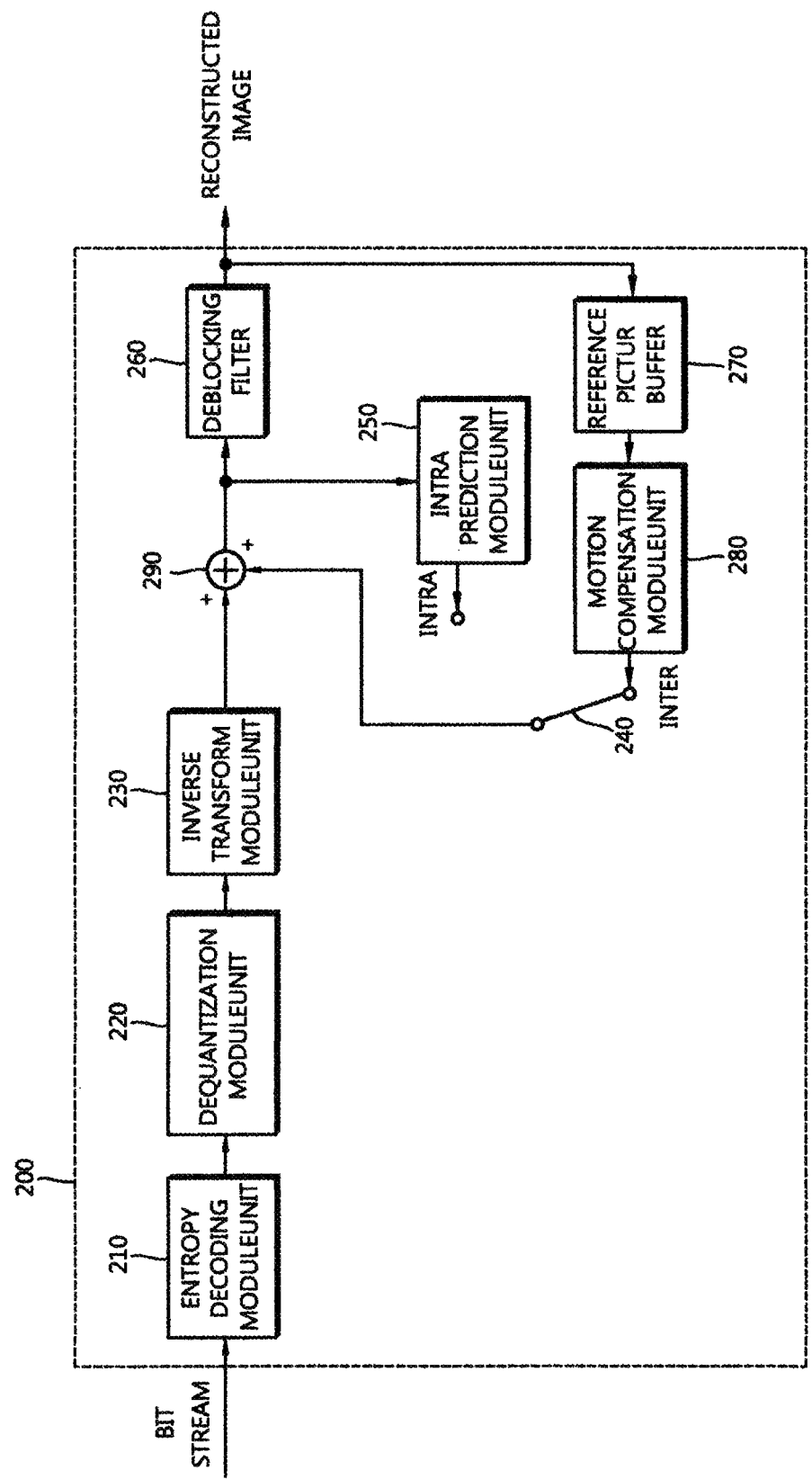
FIG. 2 is a diagram schematically showing an example of a decoder structure.

FIG. 2 is a diagram schematically showing an example of a decoder structure. The decoder of FIG. 2 may be a decoder supporting high efficiency video coding.

When performing the coding, the bitstream is output. A decoder 200 receives the bitstream and performs the received bitstream by the intra mode, thereby outputting the reconstructed images.

In the case of the intra mode, a switch 240 is switched to the intra and in the case of the inter mode, the switch 240 is switched to the inter.

A main flow of a decoding process performed in the decoder generates the prediction block and then, adds a result block of decoding the input bitstream and the prediction block, thereby generating a reconfigured block.

The generation of the prediction block is performed according to the intra mode and the inter mode. In the case of the intra mode, an intra prediction module 250 performs the spatial prediction by using the already coded neighboring pixel values of the current block, thereby generating the prediction block. In the case of the inter mode, a motion compensation module 280 searches the corresponding region in the reference picture stored in a reference picture buffer 270 by using a motion vector to perform the motion compensation, thereby generating the prediction block.

An entropy decoding module 210 performs the entropy decoding on the input bitstream according to the probability distribution and outputs the quantized coefficients. The quantized coefficients are dequantized and inversely transformed by passing through a dequantization module 220 and an inverse transform module 230 and are then coupled with the prediction images by an adder 290, thereby generating the reconstructed block. The blocking artifact of the reconstructed block is removed by a deblocking filter 260 and then, the reconstructed block is stored in a reference picture buffer 270.

Meanwhile, the high efficiency video coding/decoding may process data using, for example, a coding unit (CU) unit for each predetermined unit. The CU may be referred to as a basic block unit processing data.

Figure 3:
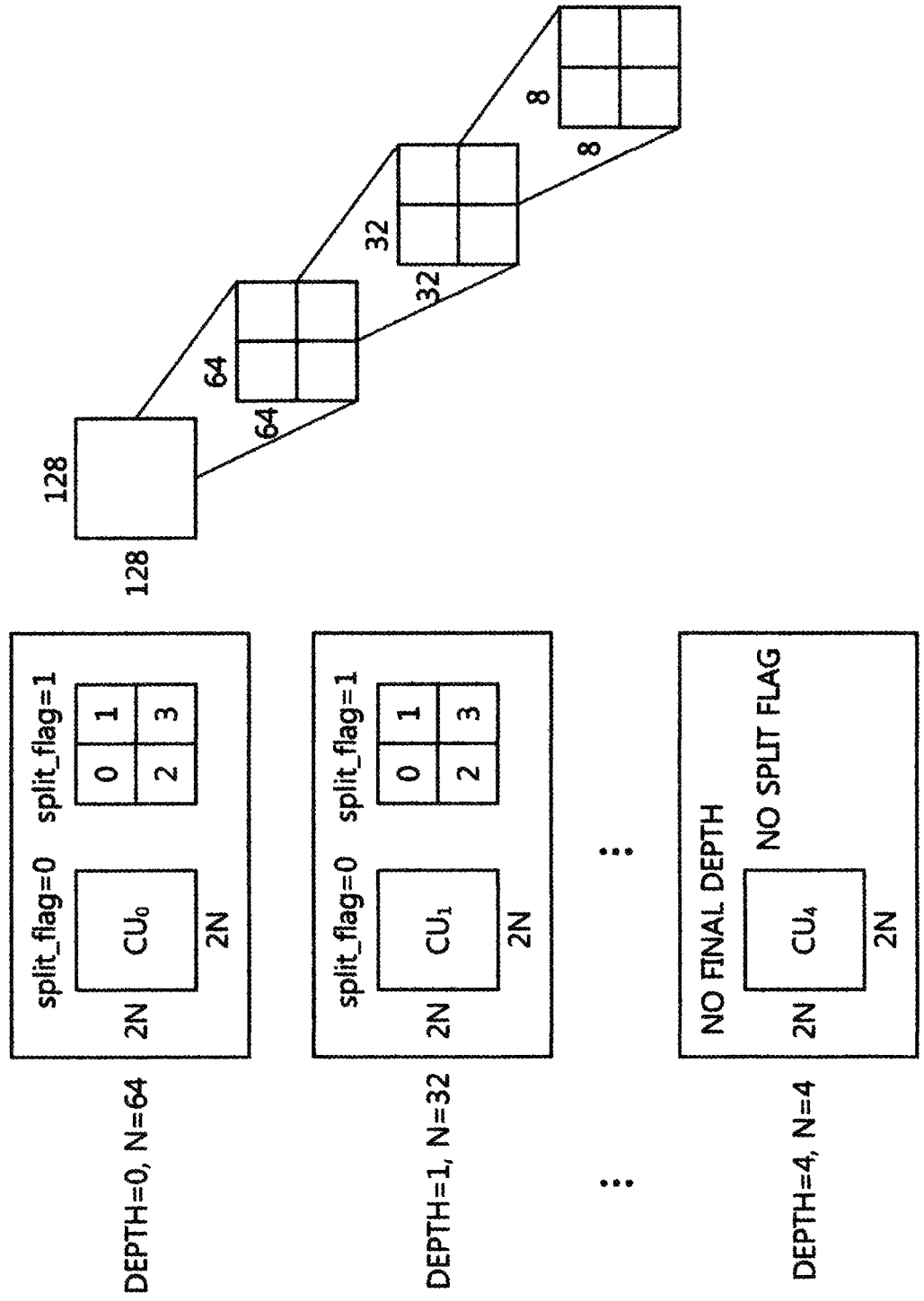
FIG. 3 is a diagram schematically explaining one split in a CU unit when processing data.

FIG. 3 is a diagram explaining the CU, wherein FIG. 3 schematically explains one performing the split in the CU unit when processing data.

Referring to FIG. 3, the image is split in an already defined basic CU unit and is then subjected to the coding while splitting the CU. The most basic CU unit is referred to as a largest coding unit (LCU). Starting to the LCU, the CU may be split into four CUs of which the size of the block is reduced half in length and width if necessary Splitting the CU is determined according to the characteristics of the images at the coding side. In the case of the complex image, the CU may be split into smaller CUs and in the case of the non-complex image, the CU may not be split into the smaller CUs. Therefore, whether the CU is split may be determined according to the efficiency in terms of the compression efficiency and the image quality.

The information on whether to split the CU is represented by a split flag. The split flag is included in all the CUs other than the CU in the smallest unit that cannot be split any more. When a split_flag of the split flag is '0', the corresponding CU is not split and when the split_flag of the split flag is '1', the corresponding CU is hierarchically split into four small CUs that are bisected in length and width, respectively.

A depth is increased by 1 every time the CU is split once. The depth of the CUs having the same size may be the same. The maximum depth of the CU may be previously defined and the CU cannot be split at a predefined maximum depth or more. Therefore, the depth of split of the CU is increased by 1 while the CU is split from the LCU having a depth of 0 and the CU may not be split up to the maximum depth.

Referring to FIG. 3, when the split_flag of the split flag is 0 for the CU (LCTU) having depth 0, the CU is not split any more and when the split_flag of the split flag is 1, the CU may be split into four smaller CUs. In this case, the split small CUs may be differentiated by being allocated with indexes 0, 1, 2, and 3.

When the split is performed, the depth is increased. An example of FIG. 3 shows the case in which the maximum depth is set to be 4. As shown in FIG. 3, when the CU is split up to the maximum depth 4, the CU is no further split.

The right drawing of FIG. 3 is a diagram schematically explaining the case in which the CU is split according to the depth when the LCU is 2N×2N pixels (N=64) and the maximum depth is 4. For convenience of explanation herein, the case in which the LCU is 128×128 is described by way of example, but the embodiment of the present invention is not limited thereto and the LCU may be defined by different sizes.

Figure 4:
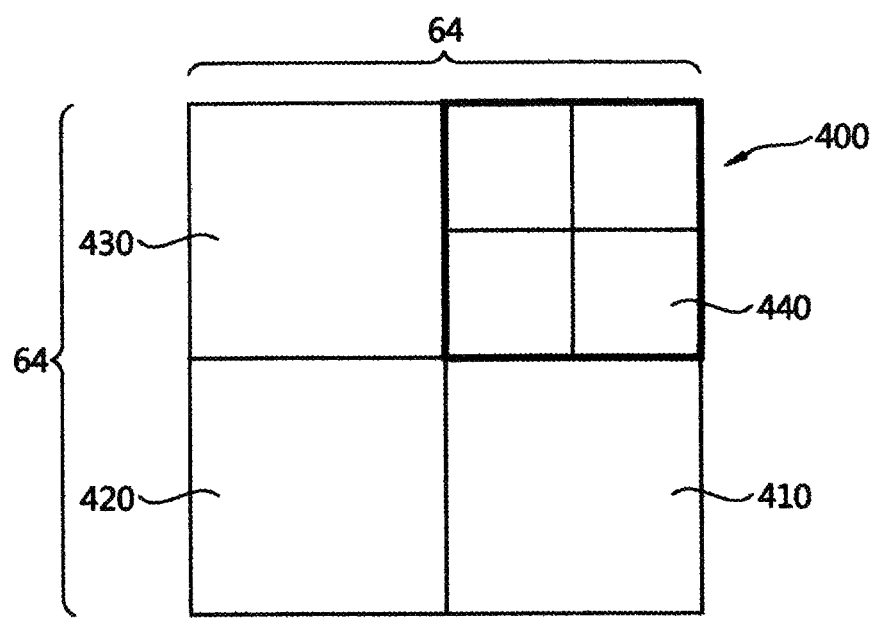
FIG. 4 is a diagram showing in detail a process of splitting a CU within an LCU.

FIG. 4 is a diagram showing in more detail a process of splitting CU within LCU.

The case in which the size of LCU 400 is 64×64 pixels and the maximum depth is 3 will be described with reference to FIG. 4. When the coding is not performed in a unit of 64×64 pixels, '1' indicating the case in which the CU is split as the split_flag of the split flag regarding the CU of 64×64 pixels is stored. Therefore, the CU of 64×64 pixels is split into four CUs of 32×32 small pixels by half in length and width.

When the CUs 410, 420, and 430 of 32×32 pixels split in the CU of 64×64 pixels are no further split, '0' indicating the case in which the CU is not split as the split-flag of the split flag is stored. In this case, the CUs 410, 420, and 430 may be coded in a unit of 32×32 pixels using the intra mode or the inter mode.

When the CU 440 of 32×32 pixels is split in four smaller CUs of 16×16 pixels, '1' is stored as the split-flag of the split flag regarding the CU 440 and the four CUs of 16×16 pixels is coded. Even though the predetermined maximum depth is 3, if the CU of 16×16 pixels is set to the smallest CU (depth 2), the CU may not be split any more and therefore, may not include the split flag. When the CU of 16×16 pixels is not set to be the smallest CU, the 16×16 pixels may be no further split. In this case, '0' is stored as the split flag.

Figure 5:
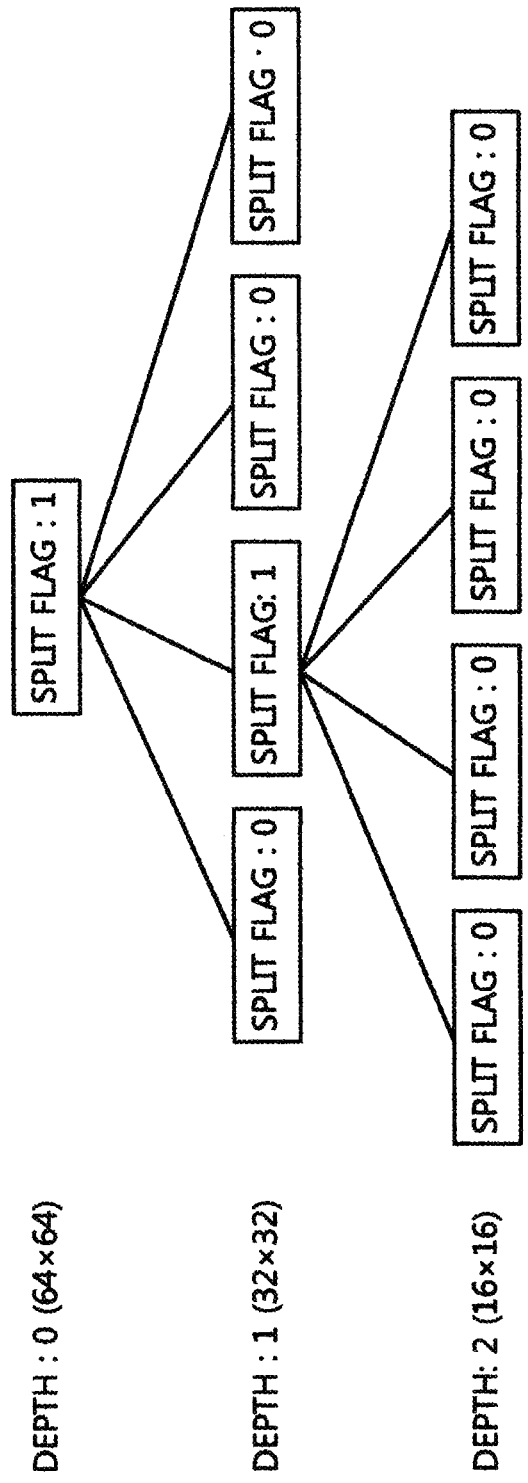
FIG. 5 is a diagram schematically explaining split flag established when the split is performed.

FIG. 5 is a diagram schematically explaining the split flag established when the split is performed like the example of FIG. 4. Referring to FIG. 5, when the split flag regarding each CU is transmitted in the LCU unit, the split flag regarding the CU of 64×64 pixels is first stored. Meanwhile, when the CU of 64×64 pixels is split, the split flag regarding four CUs of 32×32 pixels subsequent to the split flag regarding the CU of 64×64 pixels is stored. Therefore, in the decoder, the split flag regarding the CU of 64×64 pixels is first confirmed and when the CU of 64×64 pixels is split, the split flag regarding the CU of 32×32 pixels may be confirmed.

In the example of FIG. 4, the CU 440 is split again. In FIG. 5, the split flag regarding CU 440 is instructed by a second split flag at depth 2. Therefore, after the split flag regarding the CU 440 is stored, the split flag regarding the four CUs of 16×16 pixels split from the CU 440 is stored.

Next, in the LCU 400 of FIG. 4, the split flag regarding the CU 420 at the lower left end and the CU 410 at the lower right end is stored in order.

As shown in FIG. 5, when the CU is spilt in the real image, the hierarchical split is performed in the LCU unit. For example, in the case of FIG. 4, the maximum depth is 3 and therefore, when the depth is 3, the CU is no further split. Therefore, the split flag exists only in the CU when the depth is 0, 1, and 2. The size and the maximum depth of the LCU can determine the storage frequency of the split flag regarding the CU and the size of the CU upon compressing the image and therefore, may be considered as very important information.

Figure 6:
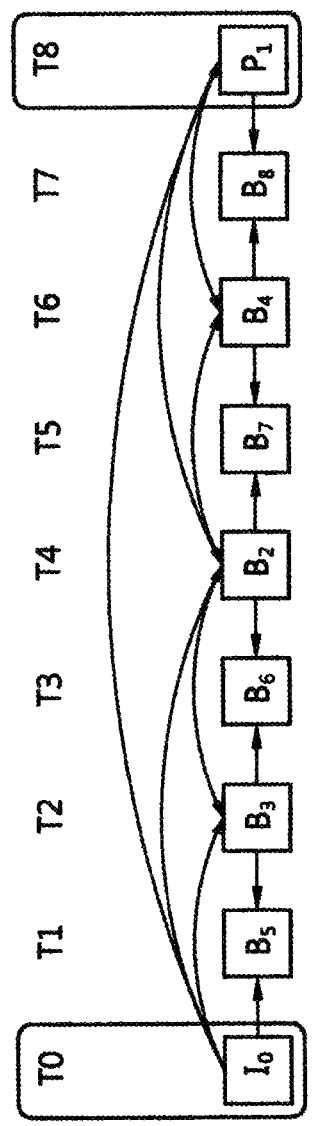
FIG. 6 is a diagram schematically showing a hierarchical structure between frames applied when inter-picture prediction (inter prediction) is performed.

FIG. 6 is a diagram schematically showing a hierarchical structure between frames applied when inter-picture prediction (inter prediction) is performed. In the high efficiency video coding/decoding, all the CUs allocate the intra mode, that is, an intra frame (I-frame) within a frame for each predetermined frame and quickens an arbitrary access at the time of reproducing the image.

FIG. 6 shows, by way of example, the case in which the inter-picture prediction is hierarchically performed by allocating 9 frames into one group. In the example of FIG. 6, number 0 frame T0 is coded with the intra frame 10 and number 8 frame T8 is coded by performing the inter-picture prediction through the number 0 frame T0. Next, when number 4 frame T4 is coded, the inter-picture prediction may be performed through the number 0 frame T0 and the number 8 frame T8 that are temporally previous and subsequent. As described above, the number 2 frame is hierarchically coded through the number 0 frame T0 and the number 4 fame T4 and number 6 frame T6 is coded through the number 4 frame T4 and the number 8 frame T8. Finally, number 1 frame T1 is coded through the number 0 frame T0 and the number 2 frame T2, number 3 frame T3 is coded through the number 2 frame T2 and the number 4 frame T4, number 5 frame T5 is coded through the number 4 frame T4 and the number 6 frame T6, and finally, number 7 frame T7 is coded through the number 6 frame T6 and the number 8 frame T8.

When the coding is performed as described above, the number 1 frame to the number 8 frame may be coded by determining the intra mode or the inter mode in the CU unit. When the CU is the inter mode, the motion compensation is performed in the block unit. In this case, each block performs the motion compensation through forward prediction (L0 prediction) and inverse prediction (L1 prediction). In this case, the coding may be divided into the case in which the coding is performed by using only one of the L0 prediction and the L1 prediction and the coding is performed by using both of the L0 prediction and the L1 prediction. Meanwhile, the frame using only the L0 prediction in the frame unit is referred to as a P frame (prediction frame) and the frame using both of the L0 prediction and the L1 prediction is referred to as a B frame (Bi-prediction frame).

Meanwhile, in the high efficiency video coding/decoding, the coding or the decoding is performed in the CU unit. In this case, most of the information is independently coded in the CU unit. Describing distribution of the information within the CU for each quantization parameter (QP) at the bitstream, the information on the CU (intra prediction direction information (IntraDir), split flag, skip information, motion merge information, coding mode information (Predic), block split flag (Part size), motion prediction information (AMVP), motion difference information (MVD), prediction direction information (Dir), or the like) accounts for a great part in the bitstream.

In addition, as the size of the quantization parameter is large, a weight of coding a transform coefficient is small. As a result, a weight of other information is relatively increased within the CU. In particular, when the value of the quantization parameter is largest, the ratio of the information on the CU is increased to occupy about 50%. In this case, when considering the information (information and the like on whether the coding is performed in the block unit) used for the coding of the transform coefficient, a bit amount other than the transform coefficient is 60% or more.

The information is coded by a context based adaptive variable length coding (CAVLC) method or a context based adaptive arithmetic coding (CABAC) method considering peripheral conditions, thereby reducing the bit amount. Currently, when the information is coded, most information is coded according to a spatial correlation. In a portion of the information, the case of using the temporal correlation may exist. Further, the case of performing the coding exists without considering the spatial or temporal correlation.

When the information on the CU is coded in consideration of only the spatial correlation, the temporal correlation is higher than the spatial correlation for the coded information. In this case, the coding is performed based on the temporal correlation than the spatial correlation, thereby more increasing the coding efficiency for the corresponding information. In addition, when the coding is performed in consideration of the spatial correlation and the temporal correlation, the coding efficiency for the corresponding information may be more increased.

Therefore, for performing efficient prediction coding for each information on the CU, the information on the CU is applied to the coding by determining whether the corresponding information has the high spatial correlation or the high temporal correlation.

The coding and decoding may be performed in the CU unit. When the CU is coded, the coding may be performed by predicting the information on the corresponding CU through the information on the corresponding CU and the neighboring CU within the same frame when coding the CU. In addition, when the corresponding CU is the inter mode, the coding may be performed by predicting the information on the corresponding CU through the information on the CU within the reference frame or the coding may be performed by predicting the information on the corresponding CU through the prediction structure in the frame unit. As described above, the compression efficiency for the information within the CU may be improved by using the information on the neighboring CU.

In the case of the high efficiency video coding/decoding, the embodiment of the present invention proposes the method for predicting and coding/decoding the information on the current CU using the information on the neighboring CU upon coding/decoding the information on the CU. In this case, the neighboring CU to be used may also be the CU temporally neighboring to the current CU and the CU spatially neighboring to the current CU. In addition, the information on the neighboring CU to be used includes the information on the prediction structure in the frame unit to which the current CU and the CU neighboring to the current CU belong. For example, the embodiment of the present invention discloses (1) the method for predicting and coding/decoding the information on the current CU through the information on the CU corresponding to the current CU within the reference frame (the coding method using the temporal correlation), (2) the method for predicting and coding/decoding the information on the current CU through the information on the CU neighboring to the current CU within the same frame (the coding method using the spatial correlation), and (3) the method for predicting and coding/decoding the information on the current CU through the prediction structure in the frame unit (the coding method using the prediction structure). The (1) to (3) methods select and apply the method appropriate for the information on the CU or the (1) to (3) methods may be adaptively applied.

Hereinafter, the embodiments of the present invention will be described in detail with reference to the accompanying drawings.

Embodiment 1

Figure 7:
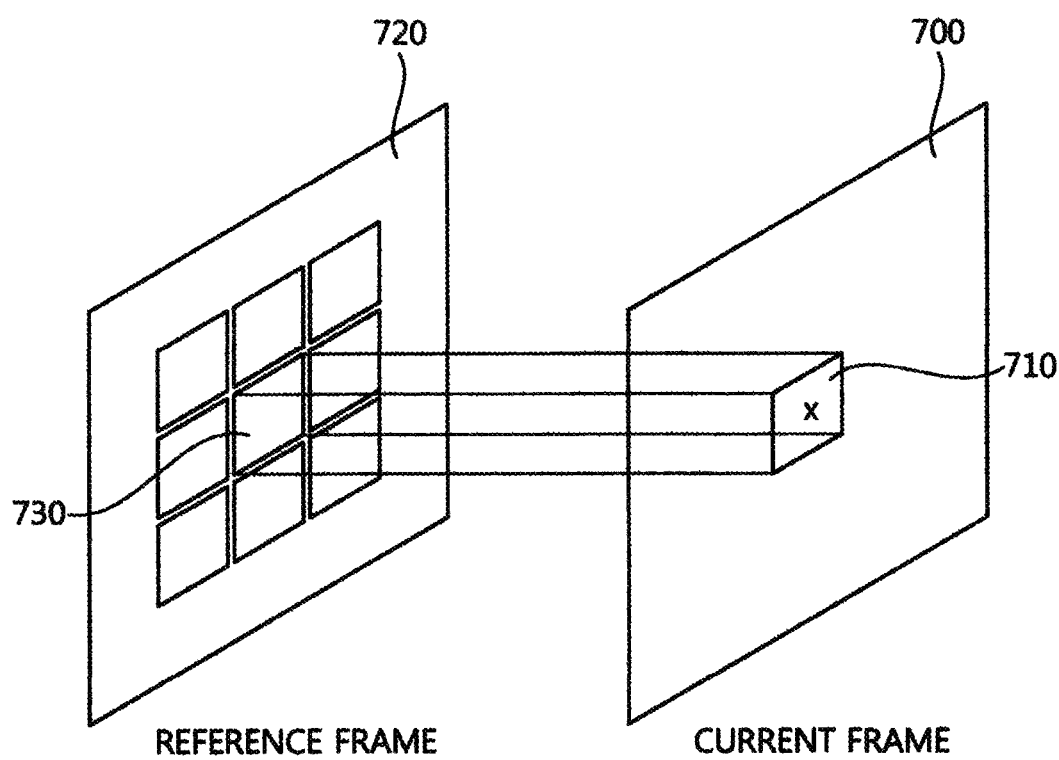
FIG. 7 is a diagram schematically explaining a correspondence relationship between CU within the current frame and a CU of a reference frame.

Method for Predicting and Coding the Information on the Current CU Through the Information on the CU Corresponding to the Current CU within the Reference Frame FIG. 7 is a diagram schematically explaining the correspondence relationship between the CU within the current frame and the CU of the reference frame. Referring to FIG. 7, when the information on the current CU 710 of a current frame 700 is coded, the information on the CU 710 to be currently coded through the information on a CU 730 corresponding to the current CU 710 among the CUs of a reference frame 720 may be predicted and coded. Further, among the CUs of the reference frame 720, information variation of the current CU 710 for the information on the CU 730 corresponding to the current CU 710 may be coded.

As described above, the information on the current CU is coded by using the information on the CU corresponding to the current CU within the reference frame, thereby improving the compression efficiency of the information on the CU.

Herein, the reference frame, which is an already coded frame before the current frame, means a frame used for temporal coding of the current frame. Here, the CU may include the CU in the smallest unit from the LCU. Further, the information on the CU to be predicted may include all the information within the CU. For example, the information on the CU may include the CU, a prediction unit (PU), a transform unit (TU) split flag, information on the intra prediction or the inter prediction, mode information on the inter prediction on the merge skip, the merge, the motion vector prediction (MVP), or the like, a motion vector, a reference picture index, weighted prediction information, prediction mode information on the intra prediction, remaining mode information among the prediction mode information on the intra prediction, discrete cosine transform (DCT)/discrete sine transform (DST), information on a transform method of quantization parameter, or the like, information on an entropy coding method, or the like.

Figure 8:
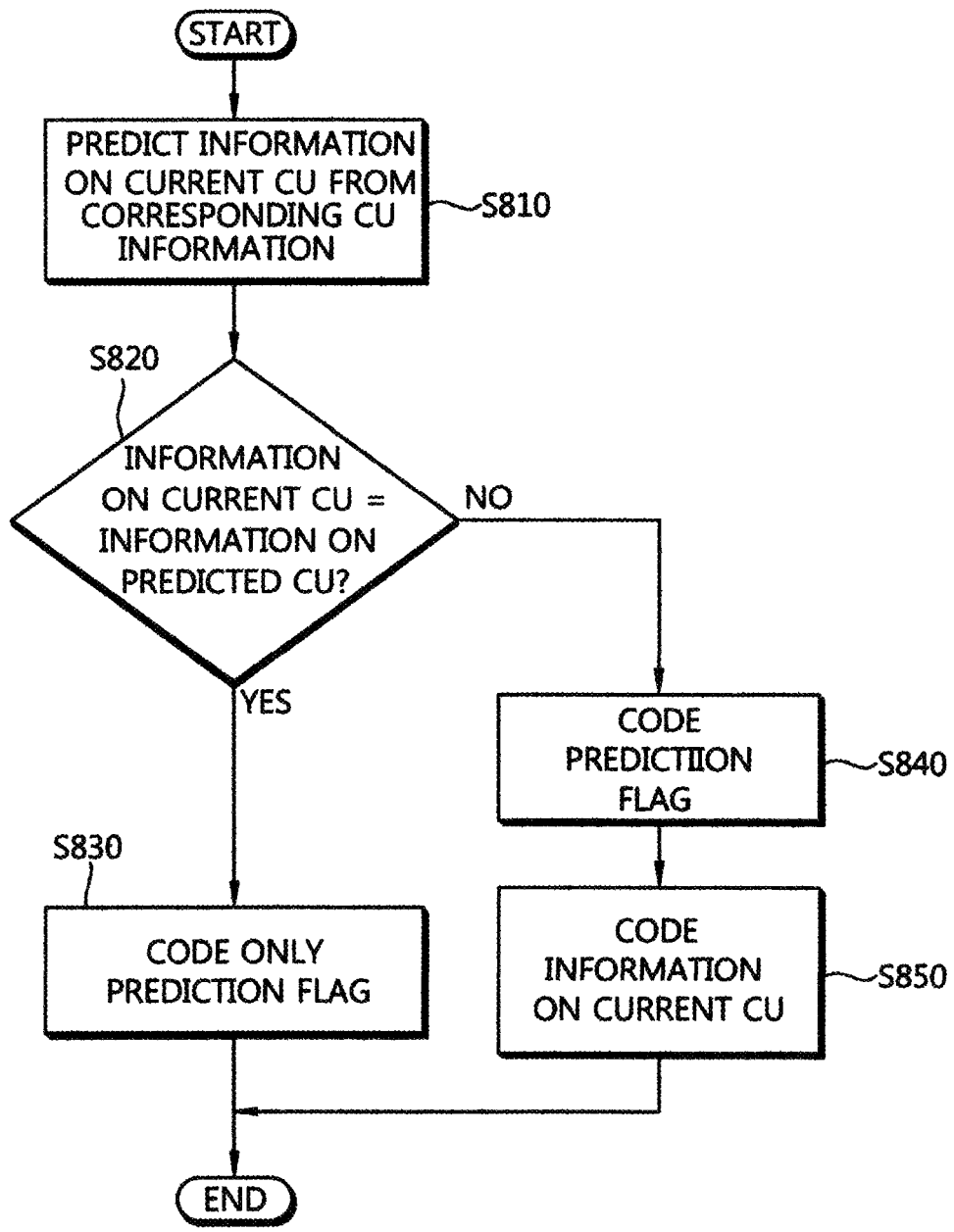
FIG. 8 is a flow chart schematically explaining an example of a method for predicting and coding the information on the current CU by using information on a neighboring CU in a system to which the embodiment of the present invention is applied.

FIG. 8 is a flow chart schematically explaining an example of a method for predicting and coding the information on the current CU by using information on a neighboring CU in a system to which the embodiment of the present invention is applied. In the example of FIG. 8, the method for predicting and coding the information on the current CU by using the information on the CU corresponding to the current CU within the reference frame will be described.

Referring to FIG. 8, when the information on the current CU is coded, the coder predicts the information on the current CU through the information on the CU corresponding to the current CU within the reference frame (S810).

The coder determines whether the predicted information is the same as the information on the current CU (S820) and when the predicted information is the same as the information on the current CU, only the prediction flag is coded and transmitted (S830). In this case, the value of the prediction flag to be coded becomes a value (for example, '1') indicating that the predicted information is the same as the information on the current CU.

When the predicted information is not the same as the information on the current CU, the prediction flag (for example, the value of the prediction flag may be '0') indicating that the two information are not the same as each other is coded and transmitted (S840). As such, when the predicted information is not the same as the information on the current CU, the information on the current CU is coded and transmitted together with the prediction flag indicating the case (S850).

When the information on the current CU is not the same as the information on the CU, various methods as described below may be applied to code and transmit the information on the current CU.

(1) Only the difference value between the information on the current CU and the information on the predicted CU may be coded.

(2) The codeword may be again generated and then, the information on the current CU may be coded, excluding the information on the predicted CU among the number of several cases relating to the information on the current CU. For example, the information on the predicted CU that may be selected as the information on the current CU may be coded using the remaining candidates, while being excluded from candidates that may be selected as the information on the current CU.

(3) The probability for the information on the current CU may be again generated through the information on the predicted CU to code the information on the current CU.

In addition to the above-mentioned (1) to (3) methods, when the information on the current CU is different from the information on the predicted CU, various methods may be applied as the method for coding the information on the current CU.

The method described in FIG. 8 may also be applied to the decoding process, in the same method as described above.

Figure 9:
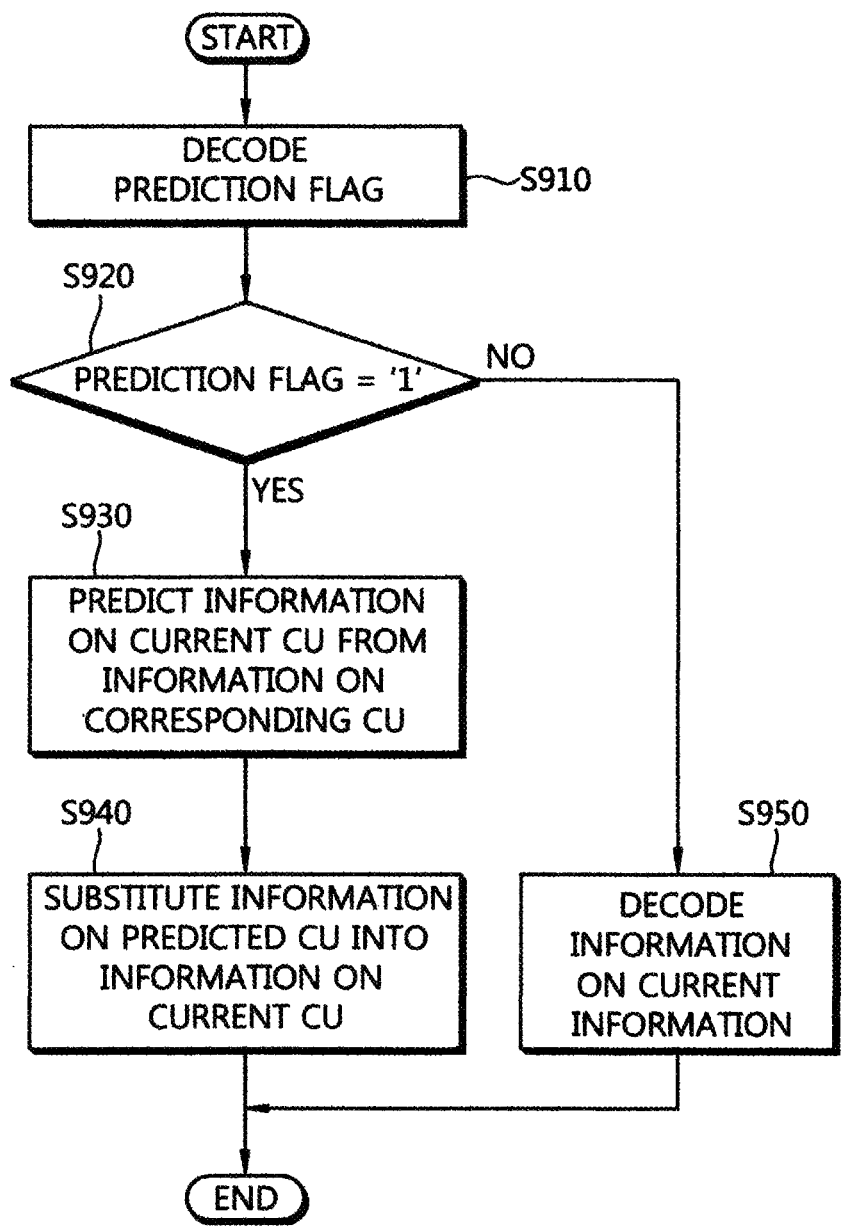
FIG. 9 is a flow chart schematically explaining an example of a method for predicting and coding the information on the current CU by using the information on the neighboring CU in a system to which the embodiment of the present invention is applied.

FIG. 9 is a flow chart schematically explaining an example of a method for predicting and decoding the information of the current CU by using information on the neighboring CU in a system to which the embodiment of the present invention is applied. In the example of FIG. 9, the method for predicting and decoding the information on the current CU by using the information on the CU corresponding to the current CU within the reference frame will be described.

Referring to FIG. 9, the decoder decodes the prediction flag so as to decode the information on the current CU (S910). The prediction flag may be coded by the coder and may be transmitted as the bitstream.

The decoder determines whether the value of the prediction flag is 1, that is, the prediction flag indicates that the information on the current CU is the same as the predicted information (S920). When the value of the prediction flag is 1, the information on the current CU is predicted from the CU corresponding to the current CU within the reference frame (S930). The decoder generates the information on the CU predicted from the CU corresponding to the current CU within the reference frame and substitutes the information on the generated CU into the information on the current CU (S940). That is, the information on the predicted CU is used as the information on the current CU.

When the value of the prediction flag is 0, the decoder decodes the information on the current CU without using the information on the neighboring CU (S950).

When the value of the prediction flag does not indicate that the information on the current CU is the same as the predicted information, the information on the current CU may be decoded by various methods as described below.

(1) The CU may be used as the information on the current CU by decoding only the difference value between the information on the current CU and the information on the predicted CU and adding the information on the predicted CU and the difference value and substituting it into the information on the current CU.

(2) The codeword may be again generated and then, the information on the current CU may be decoded, excluding the information on the predicted CU among the number of several cases relating to the information on the current CU. For example, the information on the current CU may be decoded by the method for selecting the information to be used as the information on the current CU from the remaining candidates among the candidates that may be selected as the information on the current CU, excluding the information on the predicted CU.

(3) The probability for the information on the current CU may be again generated through the information on the predicted CU to decode the information on the current CU.

In addition to the above-mentioned (1) to (3) methods, various methods may be applied as the method for decoding the information on the current CU.

As the embodiment of the present invention described in FIGS. 8 and 9, when coding the split flat of the LCU, the method for predicting and coding the split flag regarding the current LCU through the split flag regarding the LCU within the reference frame may be considered.

Actually, comparing the CU of the reference frame with the CU of the current frame, the split flat of both CUs is very similar in most cases.

FIG. 10 is a diagram for explaining the case of predicting the information on the current LCU through the information on the LCU corresponding to the current LCU within the reference frame. FIG. 10A shows the split flat of the LCU corresponding to the current LCU within the reference frame. FIG. 10B shows the split flag of the LCU of the current frame. Both of the LCUs of FIGS. 10A and 10B show the split distribution of 64×64 pixels, by way of example. Referring to FIG. 10, it can be confirmed that the split flag for the CU of the reference frame is similar to the split flag for the CU of the current frame.

Figure 11:
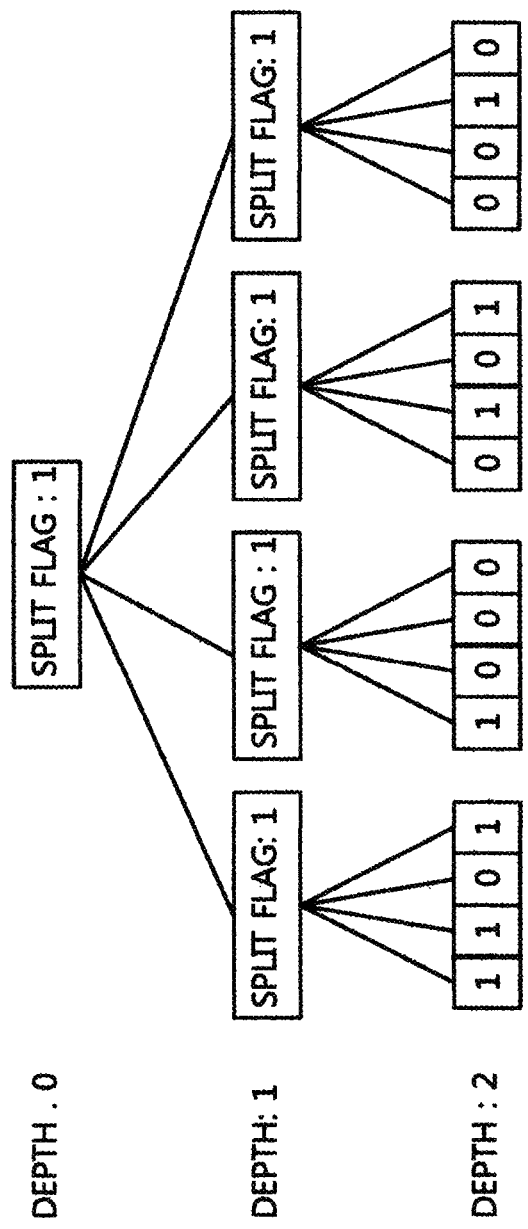
FIG. 11 is a diagram schematically explaining a method for predicting the split flag regarding the current LCU by using the split flag regarding LCU corresponding to the current LCU in the reference frame, in the system to which the present invention is applied.

FIG. 11 is a diagram schematically explaining a method for transmitting the split flag. In FIG. 11, when the split_flag of the split flag is 1, it indicates that the corresponding block is split and when the split_flag of the split flat is 0, it indicates that the corresponding block is not split.

The example of FIG. 11 shows the split flag regarding the LCU shown in FIG. 10A. Referring to FIG. 11, it can be appreciated that the split flag for the CU of the current frame is transferred at each CU level, regardless of the split structure of the reference frame.

In connection with this, the split flag for the current frame can be predicted and coded by using the split structure of the reference frame in the embodiment of the present invention.

Figure 12:
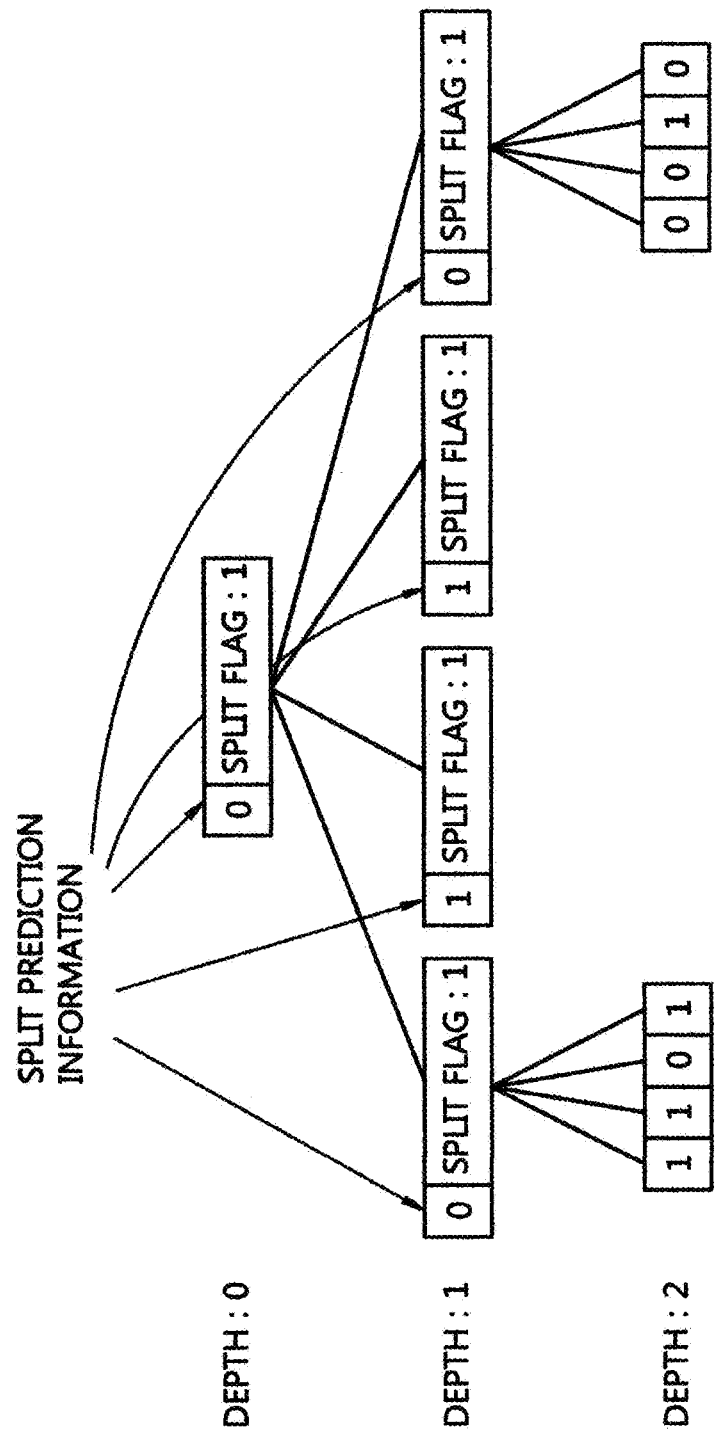
FIG. 12 is a diagram schematically explaining a method for predicting the split flag regarding the current LCU by using split flag regarding LCU corresponding to the current LCU in the reference frame, in the system to which the present invention is applied.

FIG. 12 is a diagram schematically explaining a method for predicting the split flag regarding the current LCU by using split flag regarding LCU corresponding to the current LCU in the reference frame, in the system to which the present invention is applied. The example of FIG. 12 shows the split flag regarding the LCU shown in FIG. 10B.

The split prediction information, which is the largest CU (LCU) unit at depth '0', may be used as the information indicating that the split flag of the current CU is the same as that of the CU of the reference frame. The split flag may be predicted in the depth unit.

In the example of FIG. 12, since the spilt flag regarding the LCU of FIGS. 11A and 11B for the depth 0 is different, '0' is transmitted as the split prediction information at the depth '0'.

The split flag is predicted by increasing the depth '1'. Comparing the split distribution in a unit of the four CUs of 32×32 pixels having the depth '1' with the CU of the reference frame, '1' is transferred to the split prediction information when they have the same split distribution and '0' is transferred when they do not have the same split distribution. Since the CU of 32×32 pixels at the upper left end does not have the same split distribution, '0' is transferred to the split prediction information. Meanwhile, the CU of 32×32 pixels at the upper right end has the same split distribution, '1' is transferred to the split prediction information.

When the spilt prediction information is '1', the split distribution of the CU within the reference frame may be applied to the current CU and the split flag regarding the CU for a depth deeper than the current depth may not be transferred. Next, '1' is stored as the split prediction information of the CU of 32×32 pixels at the lower left end and '0' is stored as the split prediction information of the CU of 32×32 pixels at the lower left end.

The split flag may be coded by the hierarchical method performing the prediction in a smaller unit CU by increasing the depth by '1' by the above-mentioned method only when the split prediction information is 0.

Embodiment 2

Figure 13:
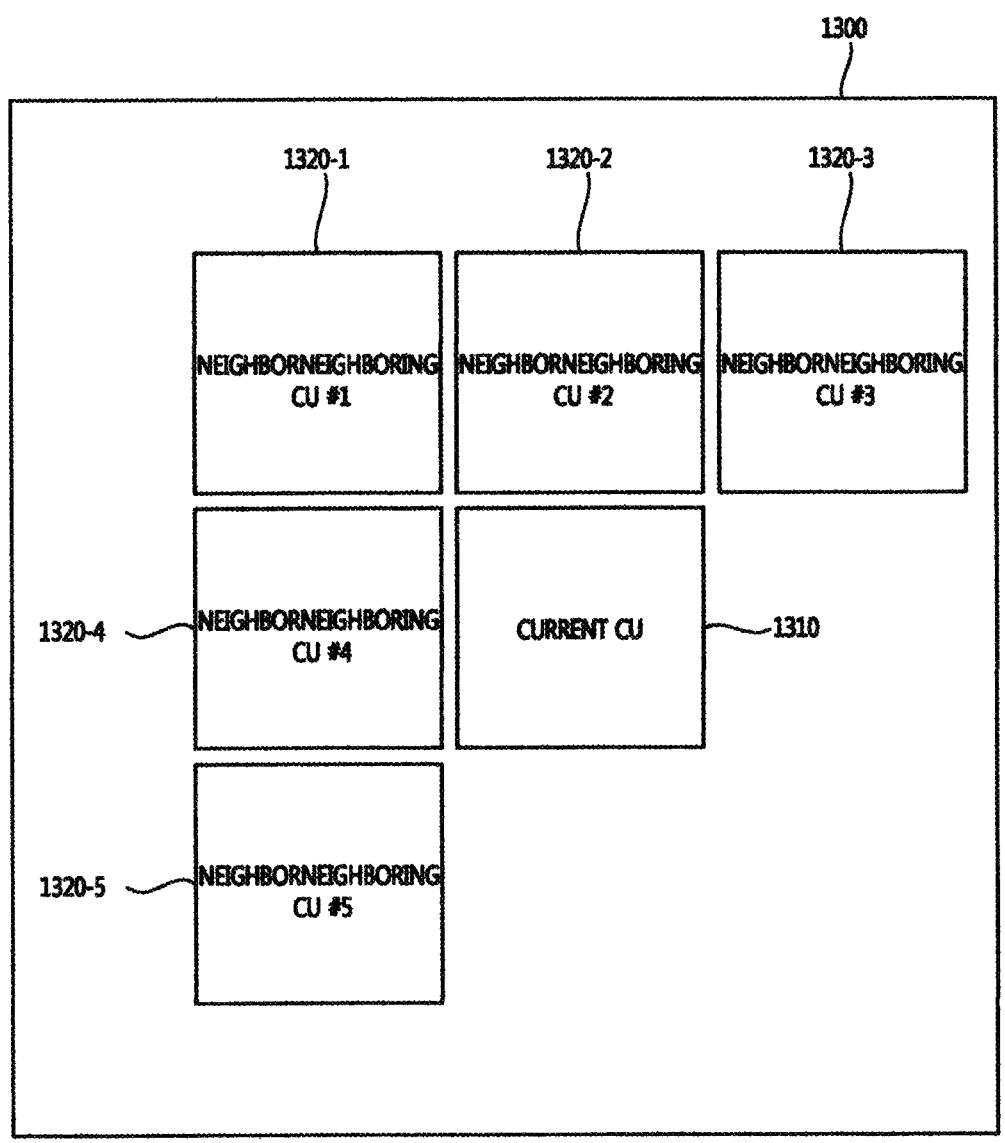
FIG. 13 is a diagram schematically showing the current CU and the neighboring CU within the same frame.

Method for Predicting and Coding the Information on the Current CU Through the Information on the Neighboring CU within the Same Frame FIG. 13 is a diagram schematically showing the current CU and the neighboring CU within the same frame.

In the high efficiency video coding, when the information on the current CU is coded, the compression efficiency of the information on the CU can be improved by predicting and coding the information on the current CU through the information on the CU neighboring to the current CU within the frame as shown in FIG. 13 or coding the information variation on the current CU for the information on the CU neighboring to the current CU.

Here, the CU may include the CU in the smallest unit from the LCU. Further, the information on the CU may include all the information within the CU. For example, the information on the CU may include the CU, a prediction unit (PU), a transform unit (TU) split flag, information on the intra prediction or the inter prediction, mode information on the inter prediction on the merge skip, the merge, the motion vector prediction (MVP), or the like, a motion vector, a reference picture index, weighted prediction information, prediction mode information on the intra prediction, remaining mode information among the prediction mode information on the intra prediction, discrete cosine transform (DCT)/discrete sine transform (DST), information on a transform method of quantization parameter, or the like, information on an entropy coding method, or the like.

Further, the information on the CU may be coded by adaptively selecting embodiment 1 and embodiment 2 in the CU unit and the information on the CU may be coded in consideration of both of the embodiments.

Figure 14:
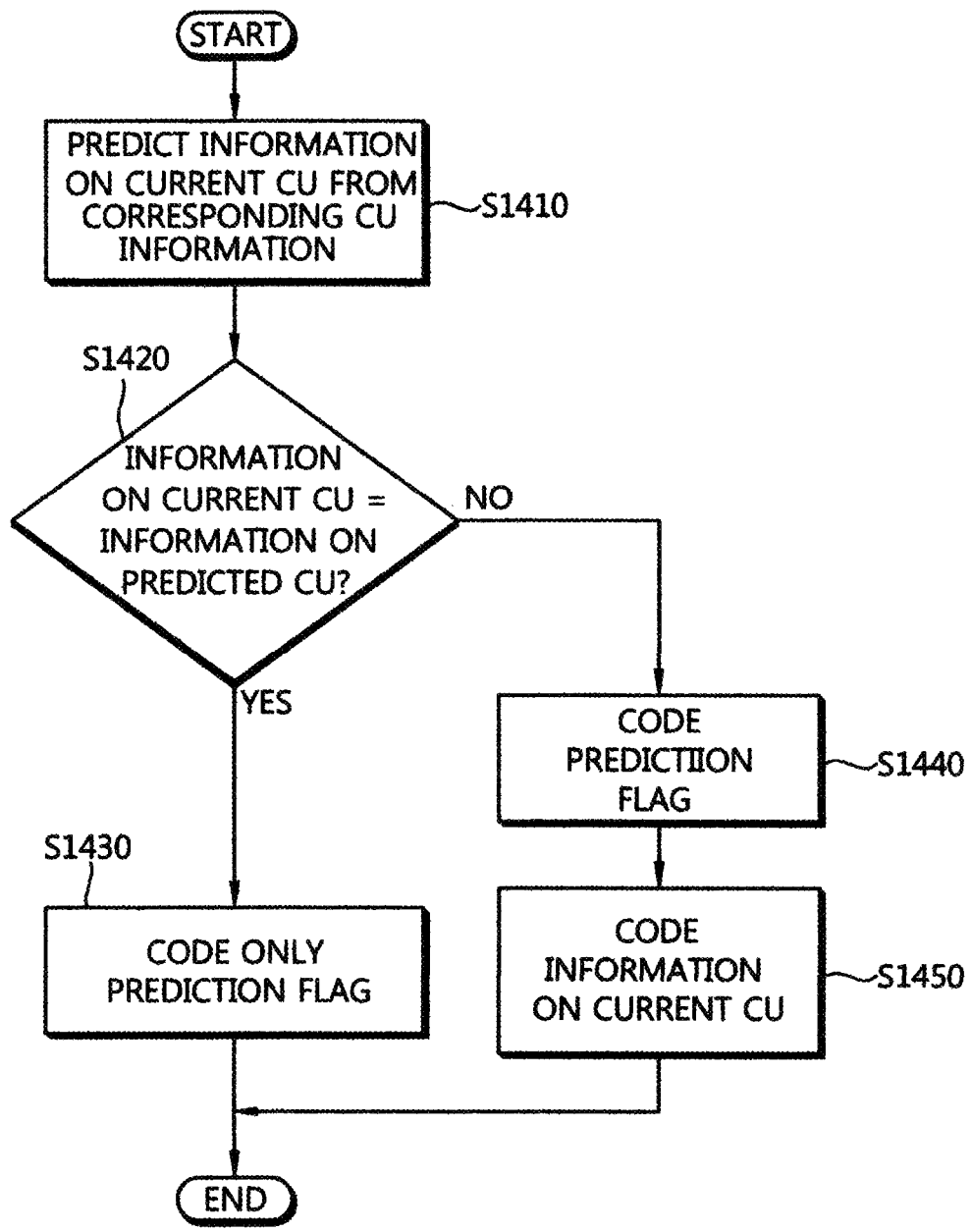
FIG. 14 is a flow chart for schematically explaining a method for predicting and coding information on a current CU through CU neighboring to the current CU when coding the information on the current CU according to the embodiment of the present invention.

FIG. 14 is a flow chart for schematically explaining a method for predicting and coding information on the current CU through CU neighboring to the current CU when coding the information on the current CU according to the exemplary embodiment of the present invention.

Referring to FIG. 14, when the information on the current CU is coded, the coder predicts the information on the current CU through the information on the already coded CU neighboring to the current CU to generate the prediction information (S1410).

The coder determines whether the information on the current CU is the same as the predicted CU information (S1420). When the information on the current CU is the same as the predicted CU information, the coder transfers the prediction flag '1' indicating that the information on the current CU is the same as the predicted CU (S1430). When the information on the current CU is not the same as the predicted CU information, the coder codes and transmits the prediction flag into the value of '0' (S1440) and at the same time, codes and transmits the information on the current CU (S1450).

Here, when the information on the current CU is not the same as the information on the predicted CU, the information on the current CU may be coded by various methods as described below.

(1) Only the difference value between the information on the current CU and the information on the predicted CU may be coded.

(2) The codeword may be again generated and then, the information on the current CU may be coded, excluding the information on the predicted CU among the number of several cases relating to the information on the current CU. For example, the information on the predicted CU that may be selected as the information on the current CU may be coded using the remaining candidates, while being excluded from candidates that may be selected as the information on the current CU.

(3) The probability for the information on the current CU may be again generated through the information on the predicted CU to code the information of the current CU.

In addition to this, when the information on the current CU is not the same as the information on the predicted CU, the information on the current CU can be coded using various methods.

The method described in FIG. 14 may be similarly applied even when the decoding is performed.

Figure 15:
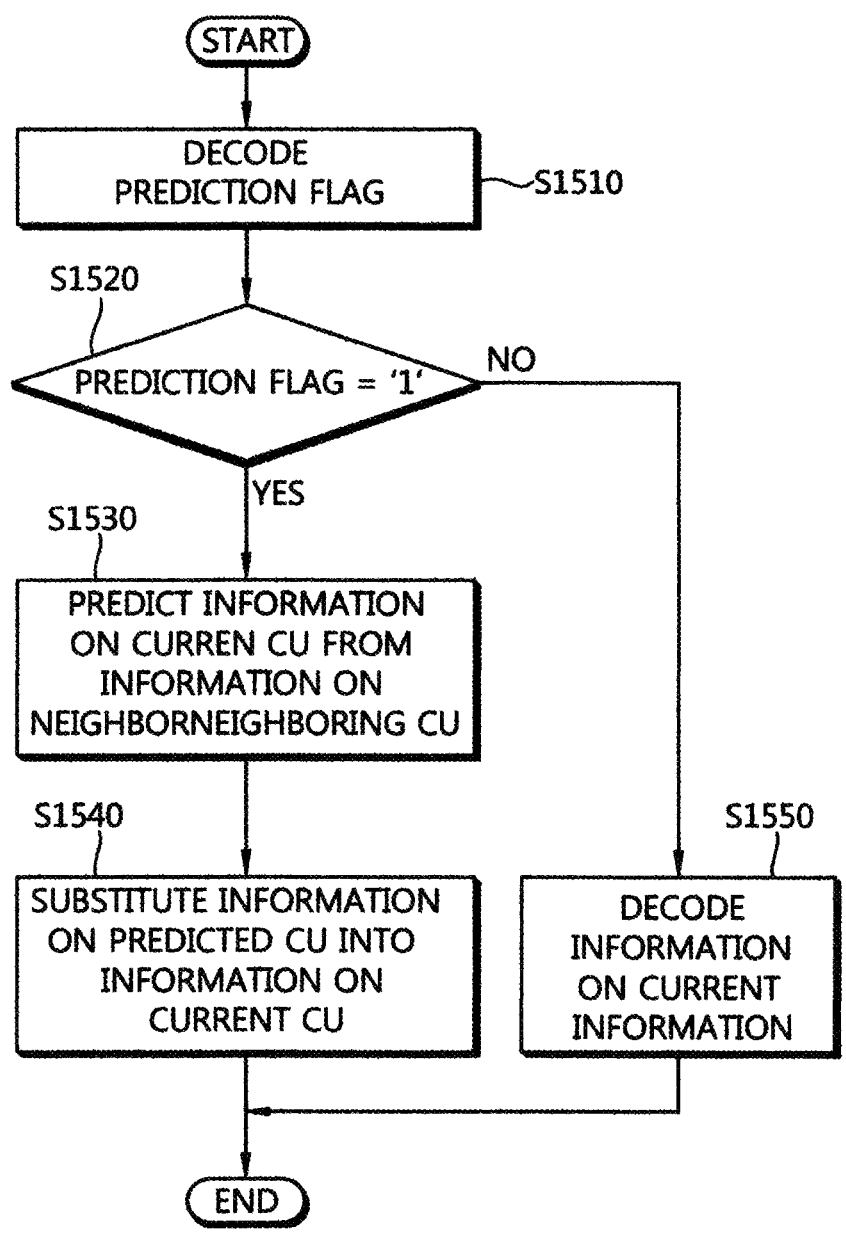
FIG. 15 is a flow chart schematically explaining another example of a method for predicting and decoding the information on the current CU by using the information on the neighboring CU in a system to which the embodiment of the present invention is applied.

FIG. 15 is a flow chart schematically explaining another example of a method for predicting and decoding the information on the current CU by using the information on the neighboring CU in a system to which the embodiment of the present invention is applied. In the example of FIG. 15, the method for predicting and decoding the information on the current CU by using the information on the CU neighboring to the current CU within the current frame will be described.

Referring to FIG. 15, the decoder decodes the prediction flag so as to decode the information on the current CU (S1510). The prediction flag may be coded by the coder and may be transmitted as the bitstream.

The decoder determines whether the value of the prediction flag is 1, that is, the prediction flag indicates that the information on the current CU is the same as the predicted information (S1520). When the value of the prediction flag is 1, the information on the current CU is predicted from the CU neighboring to the current CU (S1530). The decoder generates the information on the CU predicted from the CU neighboring to the current CU and substitutes the information on the generated CU into the information on the current CU (S1540). That is, the information on the predicted CU is used as the information on the current CU.

When the value of the prediction flag is 0, the decoder decodes the information on the current CU without using the information on the neighboring CU (S1550).

As described above, the information on the current CU that may be decoded using the information on the neighboring CU may include the CU, a prediction unit (PU), a transform unit (TU) split flag, information on the intra prediction or the inter prediction, mode information on the inter prediction on the merge skip, the merge, the motion vector prediction (MVP), or the like, a motion vector, a reference picture index, weighted prediction information, prediction mode information on the intra prediction, remaining mode information among the prediction mode information on the intra prediction, discrete cosine transform (DCT)/discrete sine transform (DST), information on a transform method of quantization parameter, or the like, information on an entropy coding method, or the like.

For example, when the current CU is the intra prediction mode, if the target information to be decoded relates to the intra prediction mode of the current CU, the prediction flag may be a flag indicating whether the current CU is coded by the intra prediction mode of the neighboring CU. Therefore, in this case, provided that the above-mentioned S1520 to 1550 are applied, the current CU may be predicted according to the intra prediction mode of the neighboring CU when the value of the decoded prediction flag is 1 and the current CU may be predicted according to another intra prediction mode, not the intra prediction mode of the neighboring CU, when the value of the decoded prediction flag is 0.

When the value of the prediction flag does not indicate that the information on the current CU is the same as the predicted information, the information on the current CU may be decoded by various methods as described below.

(1) The difference value between the current CU information and the predicted CU information may be decoded. By adding the information on the predicted CU and the difference value and substituting it into the information on the current CU, the information derived by the addition can be used as the current CU information.

(2) The codeword may be again generated and then, the information on the current CU may be decoded, excluding the information on the predicted CU among the number of several cases relating to the information on the current CU. For example, the information on the current CU may be decoded by the method for selecting the information to be used as the information on the current CU from the remaining candidates among the candidates that may be selected as the information on the current CU, excluding the information on the predicted CU. For example, when the current CU is the intra prediction mode, if the target information to be decoded relates to the intra prediction mode of the current CU, the current CU may be predicted according to another intra prediction mode, not the intra prediction mode of the neighboring CU, in the case in which the value of the prediction flag is 0, that is, making the intra prediction mode of the current CU and the intra prediction mode of the neighboring CU different from each other is indicated by the prediction flag.

(3) The probability for the information on the current CU may be again generated through the information on the predicted CU to decode the information on the current CU.

In addition to the above-mentioned (1) to (3) methods, various methods may be applied as the method for decoding the information on the current CU.

Figure 16:
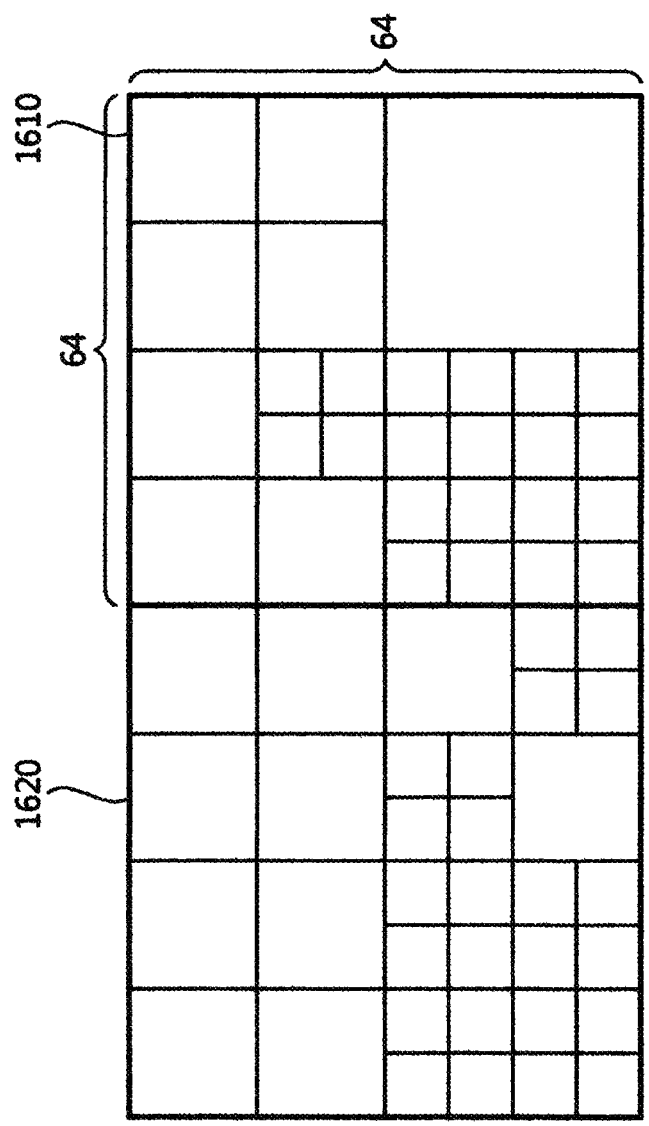
FIG. 16 is a diagram explaining one predicting and coding the information on the current CU by using the neighboring CU.

FIG. 16 is a diagram explaining one predicting and coding the information on the current CU by using the neighboring CU. FIG. 16 shows the split distribution of two neighboring 64×64 LCUs 1610 and 1620. According to the embodiment of the present invention, it is possible to use the information on the LCU 1620 when the LCU 1610 is coded.

Since the maximum CU of the LCU 1620 is 16×16 pixels and the minimum CU is 8×8 pixels, the current LCU 1610 may define the maximum CU and the minimum CU may be defined, like the LCU 1620. For example, when the current LCU 1610 is coded, the split flag is coded starting from the UC in a unit of 64×64 pixels. In this case, the LCU 1620 is not the CU in a unit of 64×64 pixels, such that that the current CU is hardly likely to become a unit of 64×64 pixels. Therefore, the split flag regarding the current CU may not be transmitted by spatially predicting the split flag.

Embodiment 3

Method for Predicting and Coding the Information on the Current CU Through the Prediction Structure In the case of the high efficiency video coding, when the CU information is coded, the compression efficiency can be improved by coding the CU information by predicting the information on the CU to be currently provided through the prediction structure. Herein, the CU may include the CU in the smallest unit from the LCU and the CU information may include all the information within the CU.

Figure 17:
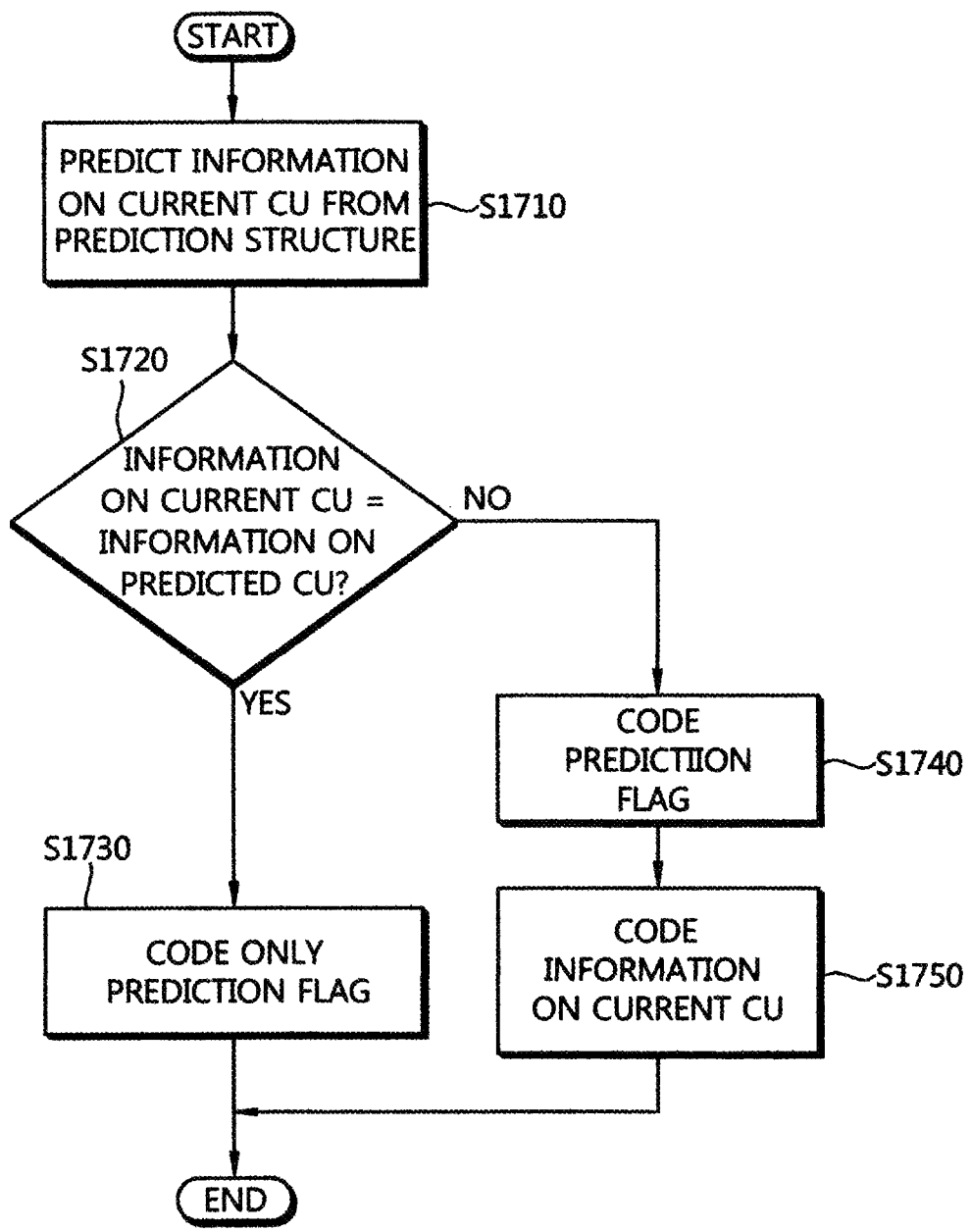
FIG. 17 is a flow chart schematically explaining an example of a method for predicting and coding the information on the current CU from the prediction structure when coding the information on the current CU according to the embodiment of the present invention.

FIG. 17 is a flow chart schematically explaining an example of a method for predicting and coding the information on the current CU from the prediction structure when coding the information on the current CU according to the embodiment of the present invention.

Referring to FIG. 17, when the current CU information is coded, the coder predicts the information on the current CU through the information on the already coded CU neighboring to the current CU through the prediction structure to generate the prediction information (S1710).

The coder determines whether the information on the current CU is the same as the predicted CU information (S1720). When the information on the current CU is the same as the information on the predicted CU, the coder transmits the prediction flag '1' indicating that the information on the current CU is the same as the predicted CU (S1730). When the information on the current CU is not the same as the information on the predicted CU, the coder codes and transmits the prediction flag into the value of '0' (S1740) and at the same time, codes and transmits the information on the current CU (S1750).

Here, when the information on the current CU is not the same as the information on the predicted CU, the information on the current CU may be coded by various methods as described below.

(1) Only the difference value between the information on the current CU and the information on the predicted CU may be coded.

(2) The codeword may be again generated and then, the information on the current CU may be coded, excluding the information on the predicted CU among the number of several cases relating to the information on the current CU. For example, the information on the predicted CU that may be selected as the information on the current CU may be coded using the remaining candidates, while being excluded from candidates that may be selected as the information on the current CU.

(3) The probability for the information on the current CU may be again generated through the information on the predicted CU to code the information on the current CU.

In addition to this, when the information on the current CU is not the same as the information on the predicted CU, the information on the current CU can be coded using various methods.

The method described in FIG. 17 may be similarly applied even when the decoding is performed.

Figure 18:
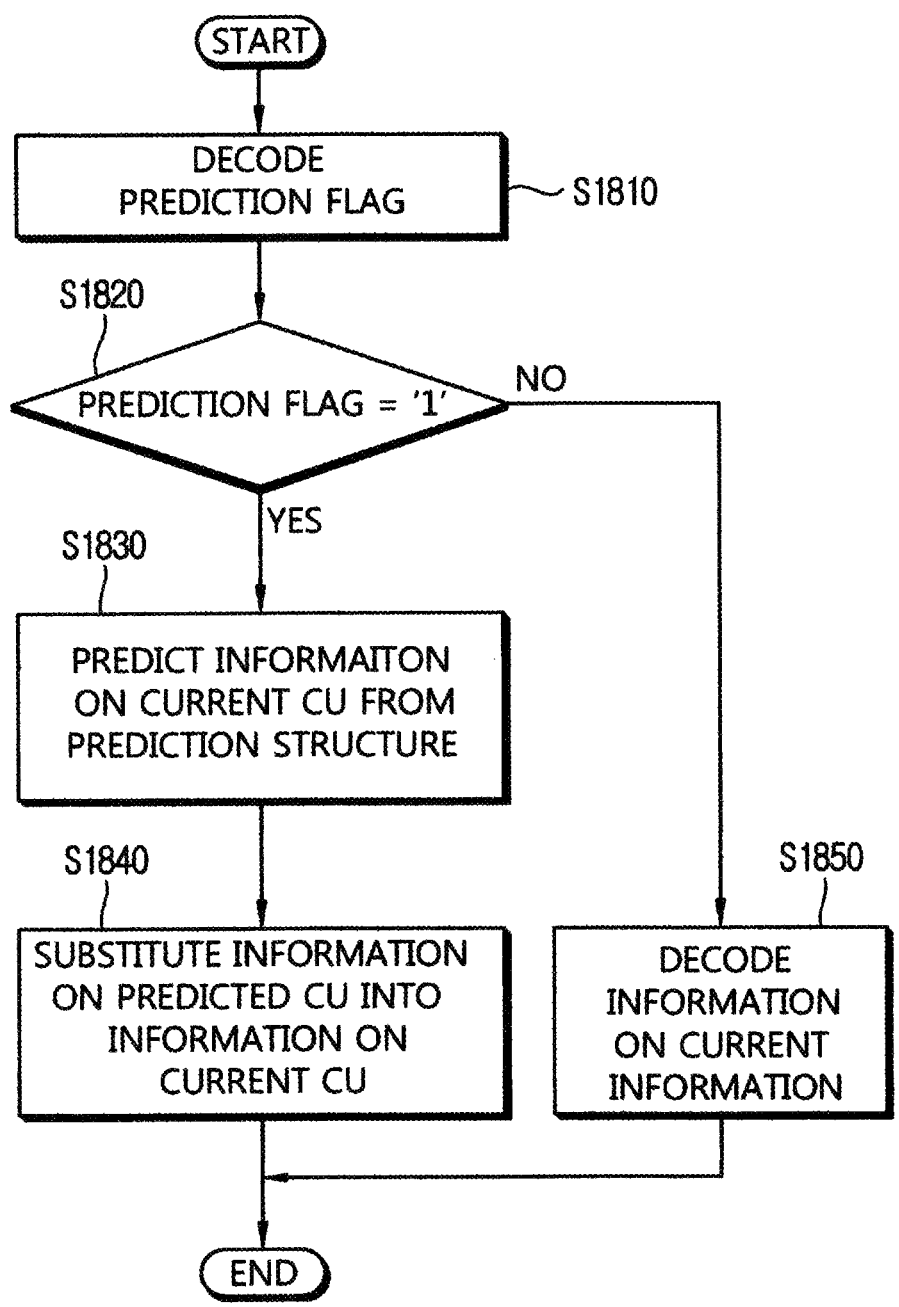
FIG. 18 is a flow chart schematically explaining an example of a method for predicting and decoding the information on the current CU by using the prediction structure to which the embodiment of the present invention is applied.

FIG. 18 is a flow chart schematically explaining an example of a method for predicting and decoding the information on the current CU by using the prediction structure to which the embodiment of the present invention is applied.

Referring to FIG. 18, the decoder decodes the prediction flag so as to decode the information on the current CU (S1810). The prediction flag may be coded by the coder and may be transmitted as the bitstream.

The decoder determines whether the value of the prediction flag is 1, that is, the prediction flag indicates that the information on the current CU is the same as the predicted information (S1820). When the value of the prediction flag is 1, the information on the current CU is predicted from the prediction structure (S1830). The decoder generates the information on the CU predicted from the prediction structure and substitutes the information on the generated CU into the information on the current CU (1840). That is, the information on the predicted CU is used as the information on the current CU.

When the value of the prediction flag is 0, the decoder decodes the information on the current CU without using the prediction structure (S1850).

When the value of the prediction flag does not indicate that the information on the current CU is the same as the predicted information, the information on the current CU may be decoded by various methods as described below.

(1) The difference value between the current CU information and the predicted CU information may be decoded. By adding the information on the predicted CU and the difference value and substituting it into the information on the current CU, the information derived by the addition can be used as the current CU information.

(2) The codeword may be again generated and then, the information on the current CU may be decoded, excluding the information on the predicted CU among the number of several cases relating to the information on the current CU. For example, the information on the current CU may be decoded by the method for selecting the information to be used as the information on the current CU from the remaining candidates among the candidates that may be selected as the information on the current CU, excluding the information on the predicted CU.

(3) The probability for the information on the current CU may be again generated through the information on the predicted CU to decode the information on the current CU.

In addition to the above-mentioned (1) to (3) methods, various methods may be applied as the method for decoding the information on the current CU.

Figure 19:
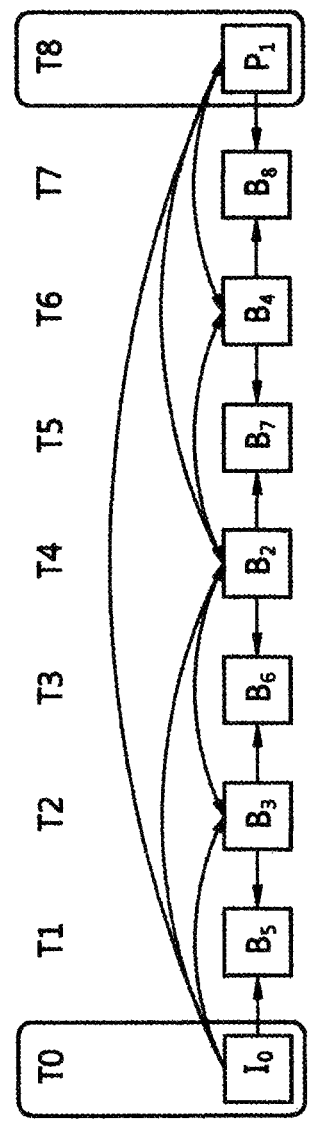
FIG. 19 is a diagram explaining one predicting and coding the information on the current CU by the prediction structure in a frame unit according to the embodiment of the present invention when including a hierarchical prediction structure.

FIG. 19 is a diagram explaining one predicting and coding the information on the current CU by the prediction structure in a frame unit according to the embodiment of the present invention when including a hierarchical prediction structure.

Referring to FIG. 19, when B frame, that is, the number 4 frame T4 is predicted and coded through the number 0 frame T0 and the number 8 frame T8, the information on the CU to be currently coded may be predicted through the prediction structure in the frame unit.

When the prediction is performed through two lists by referring to the temporally previous frame from the current frame and the temporally subsequent frame, respectively, all the CUs within the number 4 frame T4 designates L0 as the number 0 frame T0 and L1 as the number 8 frame T8. Since this has the hierarchical prediction structure in the frame unit, when the list is 1, the number 0 frame T0 or the number 8 frame T8 may be designated as the reference frame, respectively, but when the list is two, only the two reference frames are present. Therefore, the L0 designates the temporally previous frame as the reference frame and the L1 designates the temporally subsequent frame as the reference frame. In the case of the prediction structure shown in FIG. 19, many CUs perform the prediction by using two lists by referring to the temporally previous frame and the temporally subsequent frame, respectively. Therefore, when the reference index designating the reference frame is stored within the CU information, the reference index for each list is not transmitted in the case in which the prediction is performed by two lists by referring to the temporally previous frame and the temporally subsequent frame, respectively, and only the information corresponding to the case in which the prediction is performed by two lists by referring to the temporally previous frame and the temporally subsequent frame, respectively, is transmitted. In other cases, the compression efficiency for coding the reference index may be improved by transmitting the reference index of the corresponding list, together with the information that does not correspond to the case in which the prediction is performed by two lists by referring to the temporally previous frame and the temporally subsequent frame, respectively.

Figure 20:
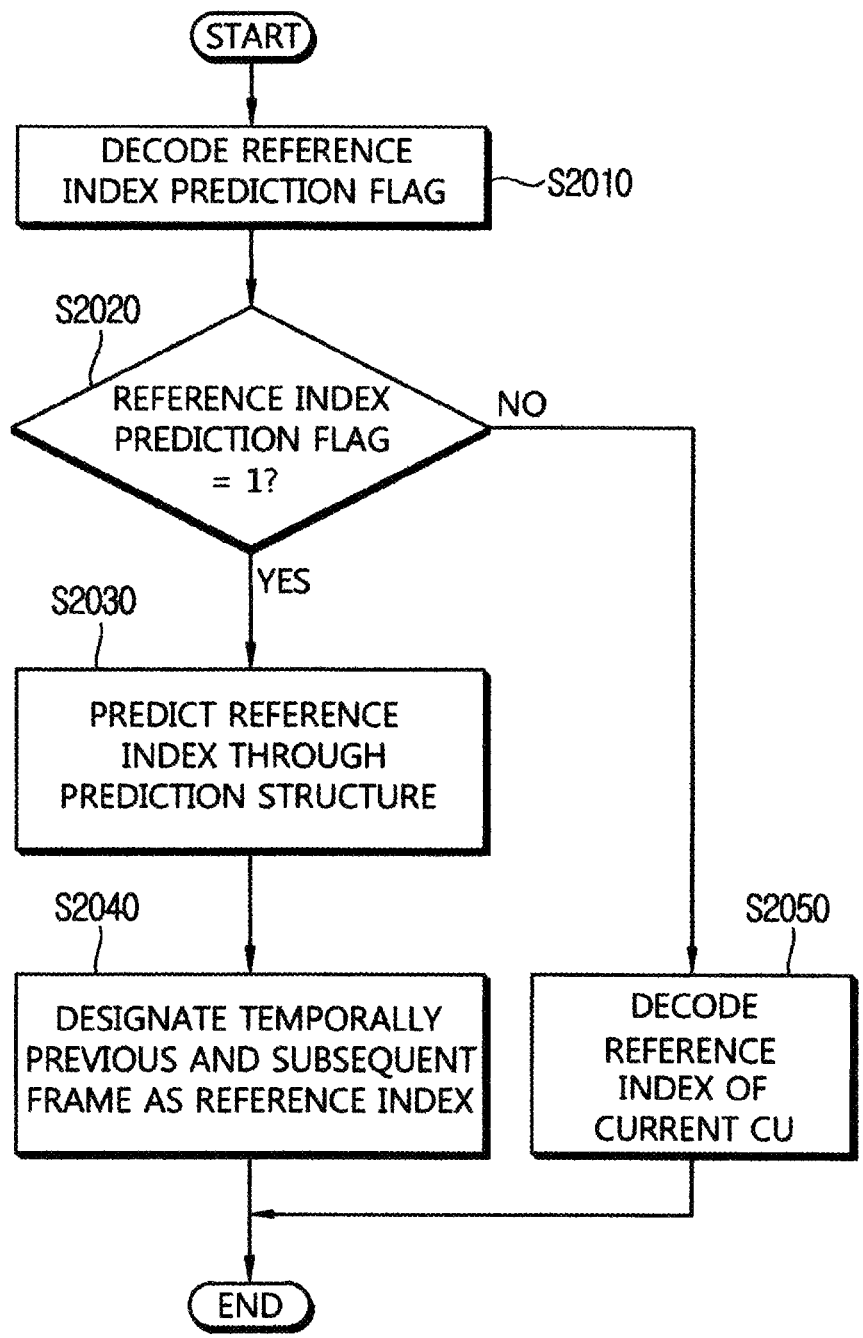
FIG. 20 is a flow chart schematically explaining an example of a method for decoding reference index prediction information according to the embodiment of the present invention.

FIG. 20 is a flow chart schematically explaining an example of a method for decoding reference index prediction information according to the embodiment of the present invention.

Referring to FIG. 20, the decoder decodes the reference index prediction flag received from the coder (S2010). When the prediction is performed by two lists by referring to the temporally previous frame and the temporally subsequent frame, respectively, the value of the decoded reference index prediction flag represents 1. In other cases, the value of the decoded reference index prediction flag represents 0.

The decoder determines whether the value of the reference index prediction flag represents 1 (S2020) and when the value of the reference index prediction flag is 1, the reference index is predicted through the prediction structure (S2030). The decoder designates the temporally previous frame and the temporally subsequent frame, respectively, as the reference index in the L0 and the L1 through the prediction structure (S2040). In addition, when the reference index prediction flag is 0, the decoder decodes the reference index corresponding to the list by the existing method (S2050).

Figure 21:
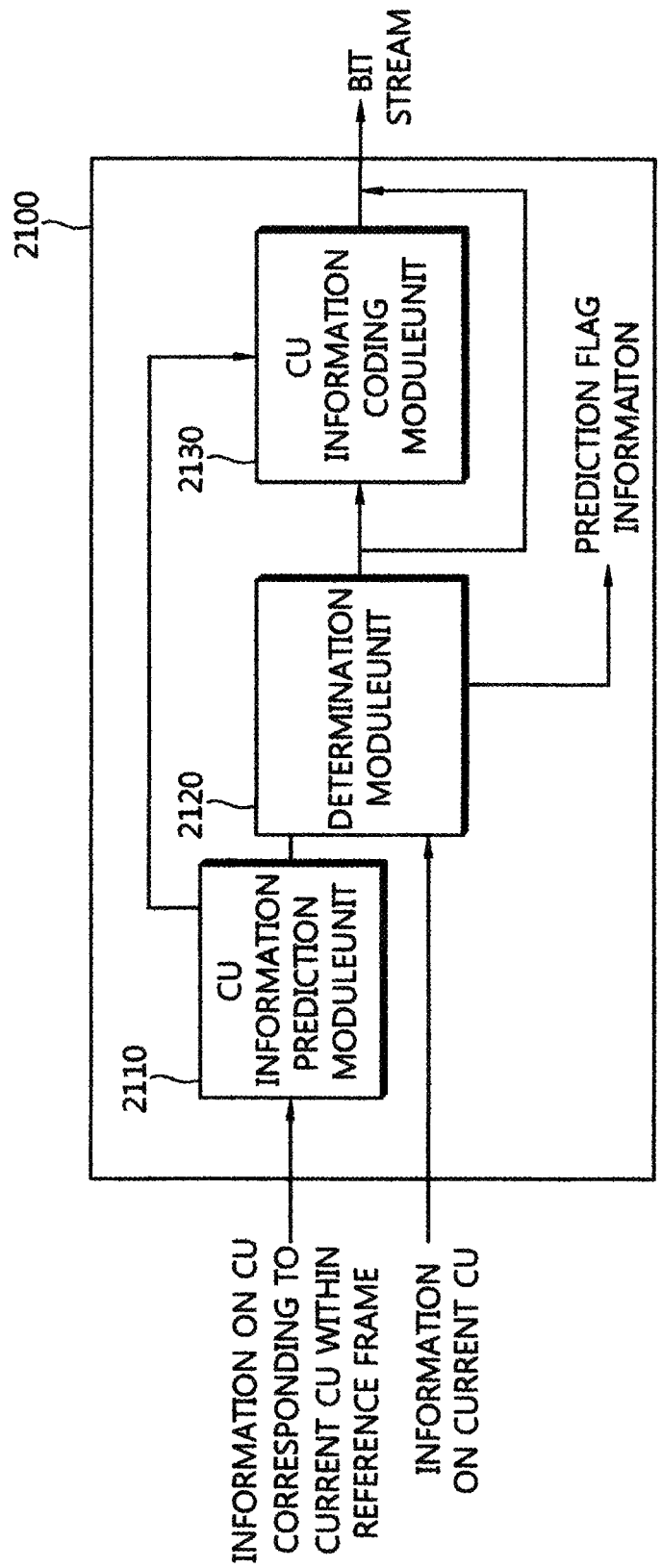
FIG. 21 is a diagram showing a schematic configuration of a coder for predicting and coding the information on the current CU through the information on the CU corresponding to the current CU within the reference frame according to the embodiment of the present invention.

FIG. 21 is a diagram showing a schematic configuration of a coder for predicting and coding the information on the current CU through the information on the CU corresponding to the current CU within the reference frame according to the embodiment of the present invention.

Referring to FIG. 21, a coder 2100 includes a CU information prediction module 2110, a determination module 2120, and a CU information coding module 2130.

The CU information prediction module 2110 receives the information on the CU corresponding to the current CU within the reference frame to output the predicted CU information.

The determination module 2120 receives the information on the current CU and the CU information predicted in the CU information prediction module 2110 to determine whether the information on the current CU is the same as the information on the predicted CU and transmits the prediction flag information according to the determination result. When the information on the current CU is the same as the information on the predicted CU, the transmitted prediction flag information is set to be '1'.

When the transmitted prediction flag information is '1', the prediction flag information is coded without separately coding the information on the current CU and is transmitted through the bitstream.

When the information on the current CU is not the same as the information on the predicted CU, the prediction flag information to be transmitted is set to be '0'.

When the prediction flag information to be transmitted is '0', the CU information coding module 2130 may code the information on the current CU by using the CU information predicted in the CU information prediction module 2110. The CU information coded in the CU information coding module 2130 is transmitted to the decoder, being included in the bitstream.

Figure 22:
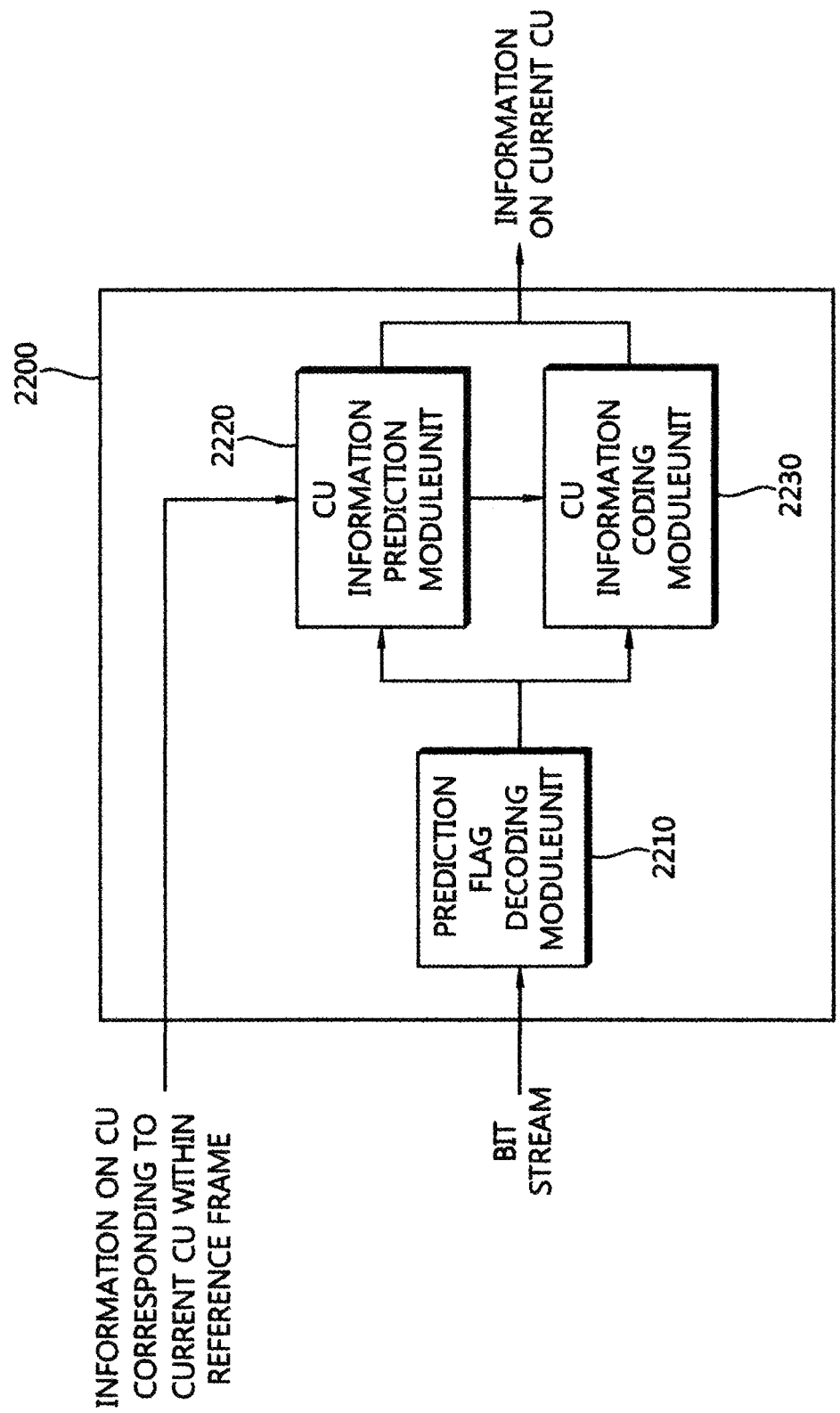
FIG. 22 is a diagram showing a schematic configuration of a decoder for predicting and decoding the information on the current CU through the information on the CU corresponding to the current CU within the reference frame according to the embodiment of the present invention.

FIG. 22 is a diagram showing a schematic configuration of a decoder for predicting and decoding the information on the current CU through the information on the CU corresponding to the current CU within the reference frame according to the embodiment of the present invention.

Referring to FIG. 22, the decoder 2200 includes a prediction flag decoding module 2210, a CU information prediction module 2220, and a CU information decoding module 2230.

When the bitstream is transmitted, the prediction flag decoding module 2210 decodes the prediction flag information.

The CU information prediction module 2120 performs the prediction through the information on the CU corresponding to the current CU.

When the value of the decoded prediction flag information is '1', the value predicted through the information on the CU corresponding to the current CU is stored as the information on the current CU within the reference frame.

When the value of the decoded prediction flag information is '0', the CU information decoding module 2130 decodes the information on the coded CU transmitted within the bitstream and is stored as the information on the current CU. In this case, the CU information decoding module 2130 may decode the information on the current CU by using the CU information predicted in the CU information prediction module 2120.

Figure 23:
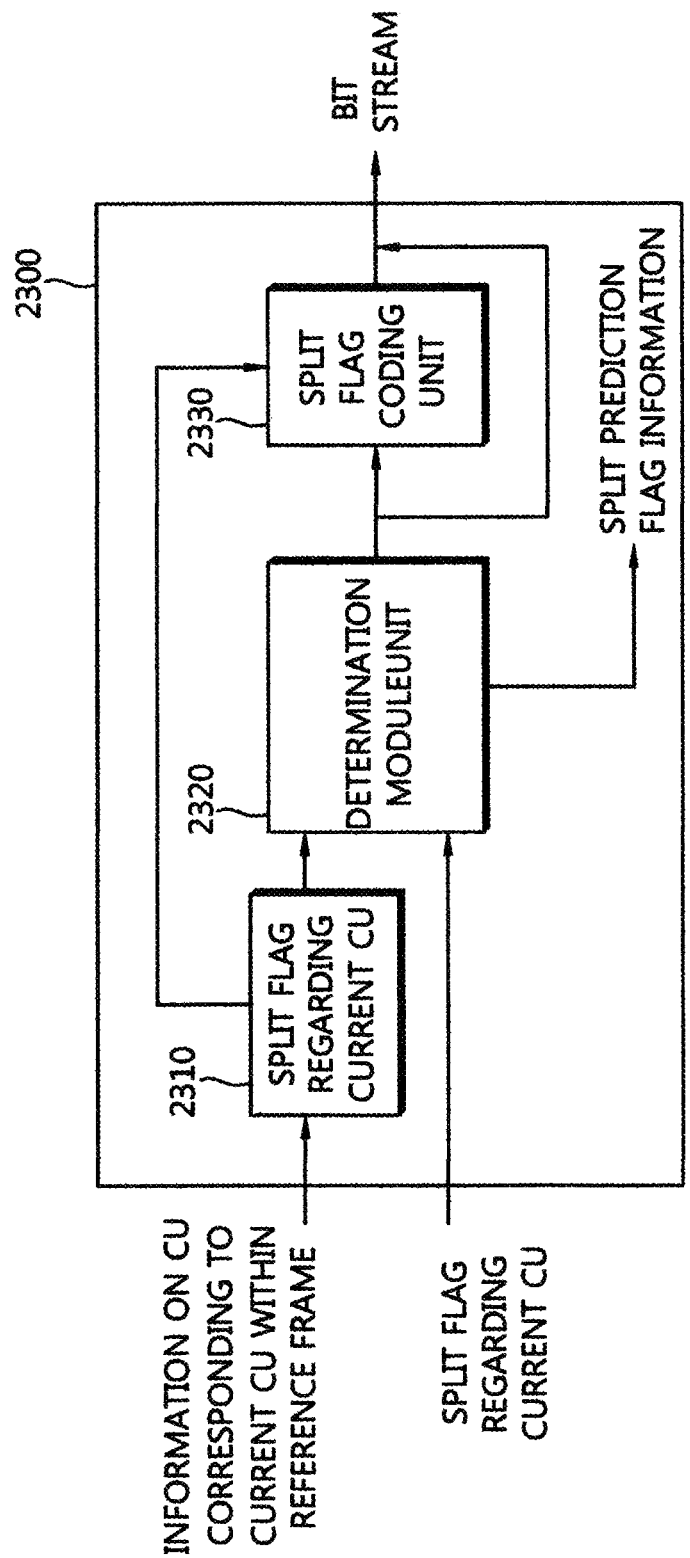
FIG. 23 is a diagram showing another example of a coder for predicting and coding the information on the current CU through the information on the CU corresponding to the current CU within the reference frame according to the embodiment of the present invention.

FIG. 23 is a diagram showing another example of a coder for predicting and coding the information on the current CU through the information on the CU corresponding to the current CU within the reference frame according to the embodiment of the present invention. In FIG. 23, the coder predicts and codes the split flag regarding the current CU through the CU corresponding to the current CU within the reference frame.

Referring to FIG. 23, the coder 2300 includes a CU split flag prediction module 2310, a determination module 2320, and a CU split flag coding module 2330.

The CU split flag prediction module 2310 receives the split flag regarding the CU corresponding to the current CU within the reference frame to output the predicted CU split flag.

The determination module 2320 receives the split flag regarding the current CU and the CU split flag predicted in the CU split flag prediction module 2310 to determine whether the split flag regarding the current CU is the same as the predicted CU split flag and transmits the split prediction flag information according to the determination result. When the split flag regarding the current CU is the same as the predicted CU split flag, the transmitted prediction flag information is set to be '1'.

When the transmitted prediction flag information is '1', the split prediction flag information is coded without separately coding the split flag regarding the current CU and is transmitted through the bitstream.

When the split flag regarding the current CU is not the same as the predicted CU split flag, the split prediction information to be transmitted is set to be '0'.

When the split prediction flag information to be transmitted is '0', the CU split flag coding module 2330 may code the split flag regarding the current CU by using the CU split flag predicted in the CU split information prediction module 2310. The CU split flag decoded in the CU split flag decoding module 2330 is transmitted to the decoder, being included in the bitstream together with the prediction flag information.

Figure 24:
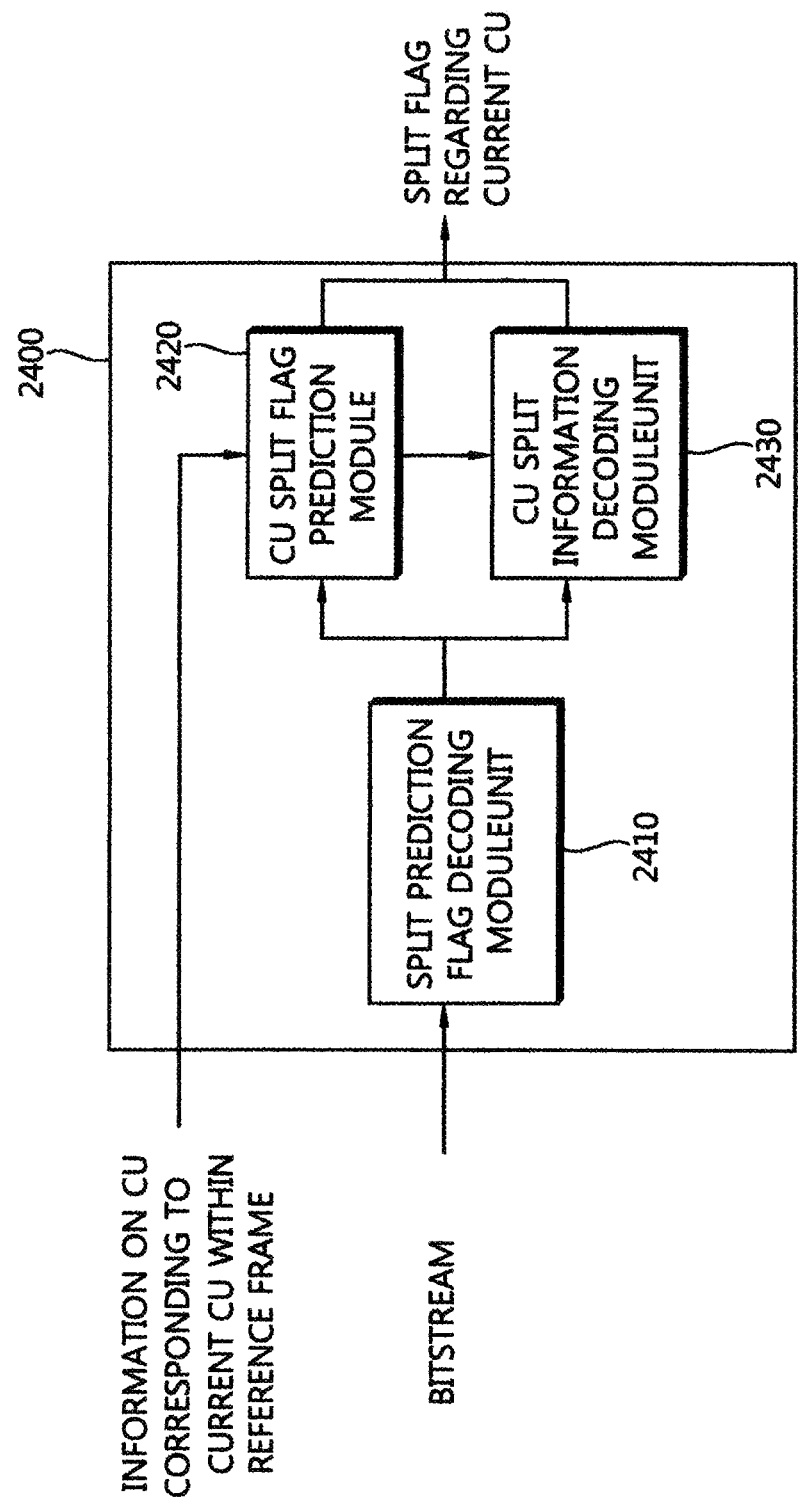
FIG. 24 is a diagram showing another example of a decoder for predicting and decoding the information on the current CU through the information on the CU corresponding to the current CU within the reference frame according to the embodiment of the present invention.

FIG. 24 is a diagram showing another example of a decoder for predicting and decoding the information on the current CU through the information on the CU corresponding to the current CU within the reference frame according to the embodiment of the present invention. In FIG. 23, the decoder predicts and decodes the split flag regarding the current CU through the CU corresponding to the current CU within the reference frame.

Referring to FIG. 24, the decoder 2400 includes a split prediction flag decoding module 2410, a CU split flag prediction module 2420, and a CU split flag decoding module 2430.

When the bitstream is transmitted, the split prediction flag decoding module 2410 decodes the split prediction flag information.

The CU split flag prediction module 2420 receives the split flag regarding the current CU through the information on the CU corresponding to the current CU within the reference frame.

When the value of the decoded split prediction flag information is '1', the value predicted through the information on the CU corresponding to the current CU is stored as the split flag regarding the current CU within the reference frame.

When the value of the decoded split prediction flag information is '0', the CU split flag decoding module 2430 decodes the split flag regarding the coded CU transmitted within the bitstream and is stored as the split flag regarding the current CU. In this case, the CU split flag decoding module 2430 may decode the split flag regarding the current CU by using the CU split flag predicted in the CU split flag prediction module 2420.

Figure 25:
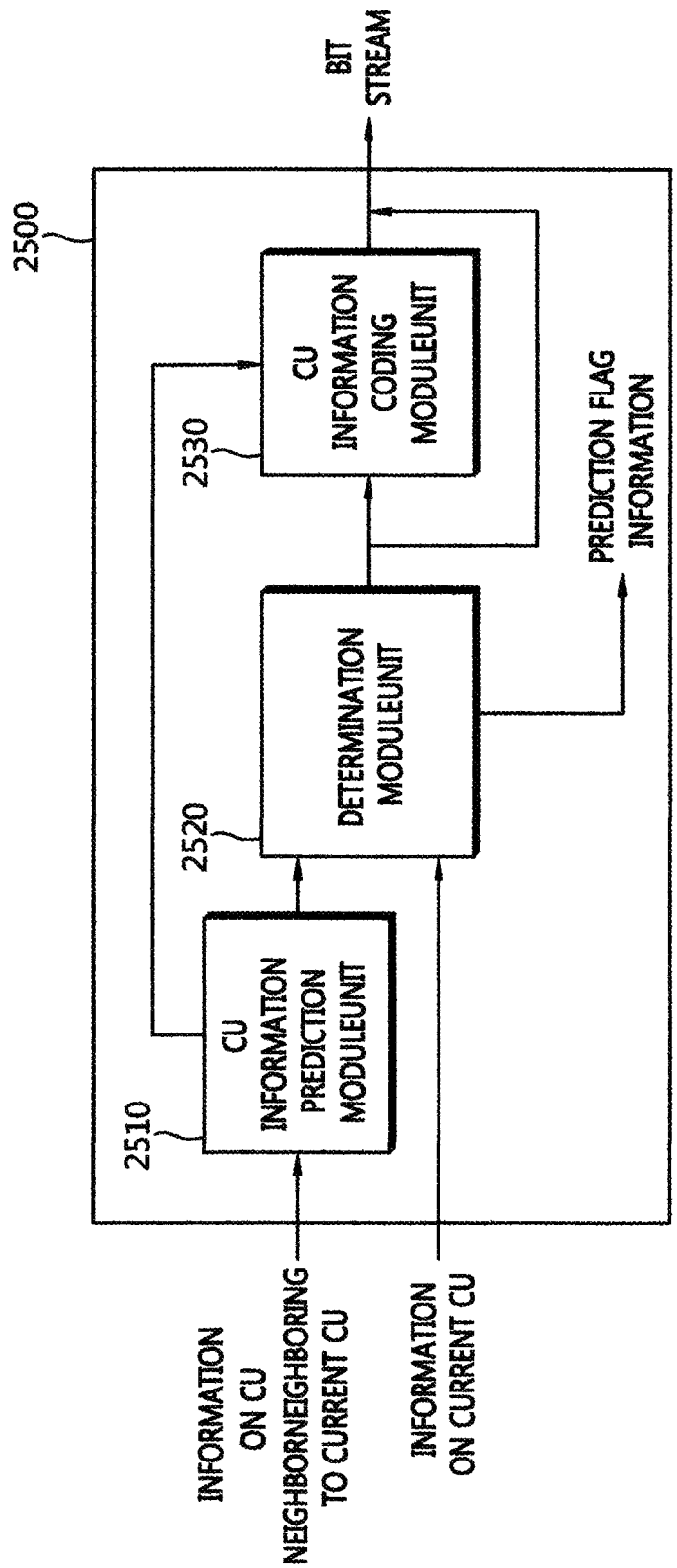
FIG. 25 is a diagram schematically showing a configuration of the coder for predicting and coding the information on the current CU by using the information on the neighboring CU within the same frame according to the embodiment of the present invention.

FIG. 25 is a diagram schematically showing a configuration of the coder for predicting and coding the information on the current CU by using the information on the neighboring CU within the same frame according to the embodiment of the present invention.

Referring to FIG. 25, a coder 2500 includes a CU information prediction module 2510, a determination module 2520, and a CU information coding module 2530.

The CU information prediction module 2510 receives the information on the CU neighboring to the current CU to output the predicted CU information.

The determination module 2520 receives the information on the current CU and the CU information predicted in the CU information prediction module 2510 to determine whether the information on the current CU is the same as the information on the predicted CU and transmits the prediction flag information according to the determination result. When the information on the current CU is the same as the information on the predicted CU, the transmitted prediction flag information is set to be '1'.

When the transmitted predict flag information is '1', the prediction flag information is coded without separately coding the information on the current CU and is transmitted through the bitstream.

When the information on the current CU is not the same as the information on the predicted CU, the prediction flag information to be transmitted is set to be '0'.

When the prediction flag information to be transmitted is '0', the CU information coding module 2530 may code the information on the current CU by using the CU information predicted in the CU information prediction module 2510. The CU information coded in the CU information coding module 2530 is transmitted to the decoder, being included in the bitstream together with the prediction flag information.

Figure 26:
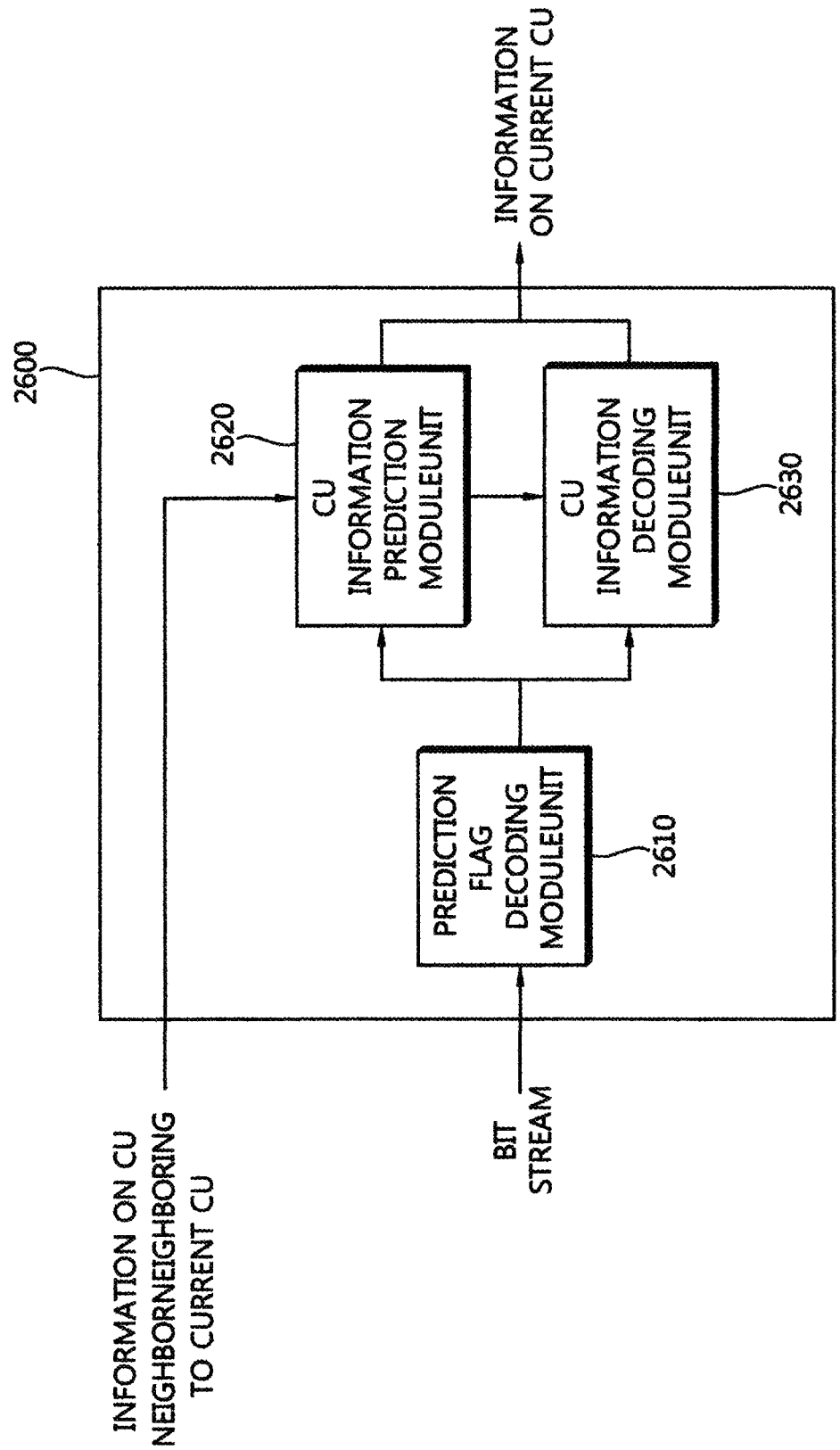
FIG. 26 is a diagram schematically showing a configuration of the decoder for predicting and decoding the information on the current CU by using the information on the neighboring CU within the same frame according to the embodiment of the present invention.

FIG. 26 is a diagram schematically showing a configuration of the decoder for predicting and decoding the information on the current CU by using the information on the neighboring CU within the same frame according to the embodiment of the present invention.

Referring to FIG. 26, a decoder 2600 includes a prediction flag decoding module 2610, a CU information prediction module 2620, and a CU information decoding module 2630.

When the bitstream is transmitted, the prediction flag decoding module 2610 decodes the prediction flag information.

The CU information prediction module 2620 predicts the information on the current CU through the information on the CU neighboring to the current CU.

When the value of the decoded prediction flag information is '1', the value predicted through the information on the CU neighboring to the current CU is stored as the information on the current CU.

When the value of the decoded prediction flag information is '0', the CU information decoding module 2630 decodes the information on the coded CU transmitted within the bitstream and is stored as the information on the current CU. In this case, the CU information decoding module 2630 may decode the information on the current CU by using the CU information predicted in the CU information prediction module 2620.

Figure 27:
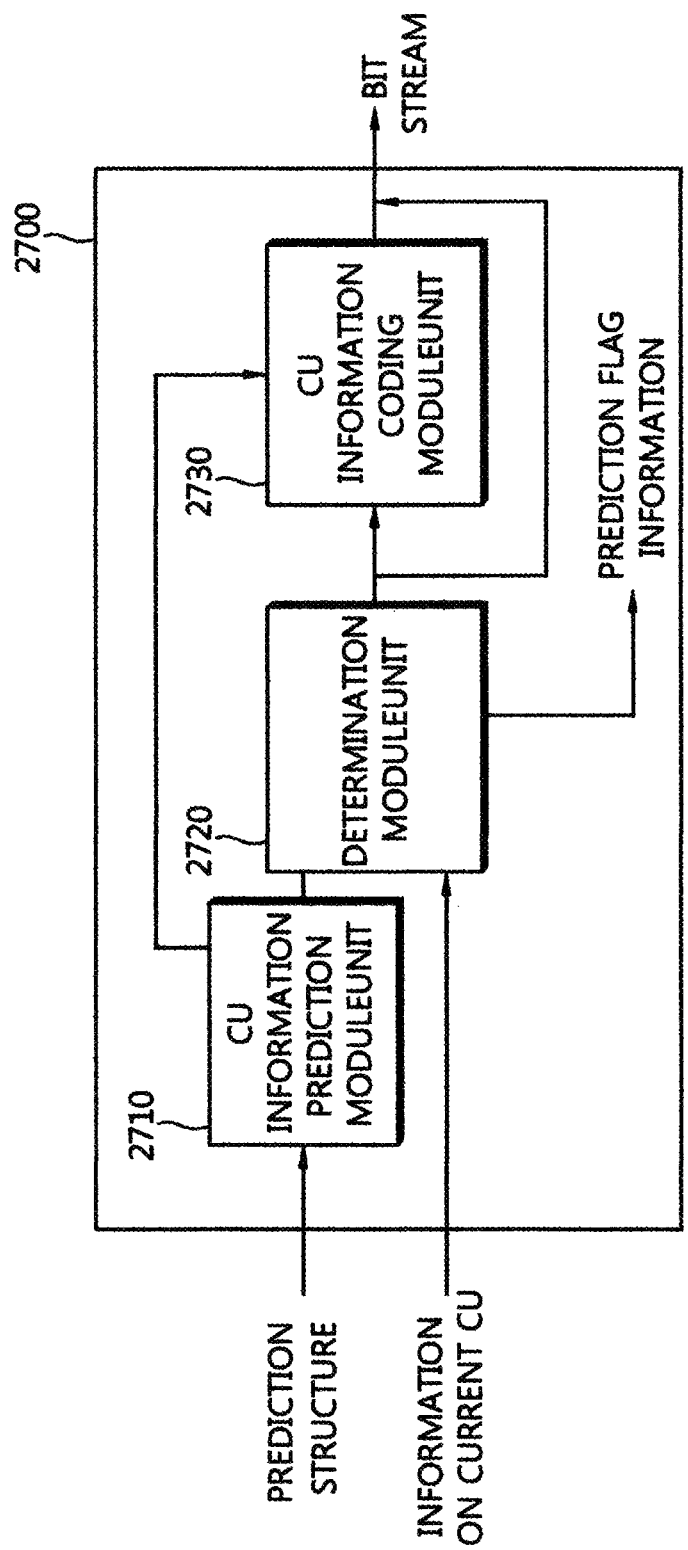
FIG. 27 is a diagram schematically showing a configuration of the coder for predicting and coding the information on the current CU through the prediction structure according to the embodiment of the present invention.

FIG. 27 is a diagram schematically showing a configuration of the coder for predicting and decoding the information on the current CU through the prediction structure according to the embodiment of the present invention.

Referring to FIG. 27, a coder 2700 includes a CU information prediction module 2710, a determination module 2720, and a CU information coding module 2730.

The CU information prediction module 2710 receives the prediction structure to output the predicted CU information. The input prediction structure is as described in FIG. 6 and FIG. 19.

The determination module 2720 receives the information on the current CU and the CU information predicted in the CU information prediction module 2710 to determine whether the information on the current CU is the same as the information on the predicted CU and transmits the prediction flag information according to the determination result. When the information on the current CU is the same as the information on the predicted CU, the transmitted prediction flag information is set to be '1'.

When the transmitted predict flag information is '1', the prediction flag information is coded without separately coding the information on the current CU and is transmitted through the bitstream.

When the information on the current CU is not the same as the information on the predicted CU, the prediction flag information to be transmitted is set to be '0'.

When the prediction flag information to be transmitted is '0', the CU information coding module 2730 may code the information on the current CU by using the CU information predicted in the CU information prediction module 2710. The CU information coded in the CU information coding module 2730 is transmitted to the decoder, being included in the bitstream together with the prediction flag information.

Figure 28:
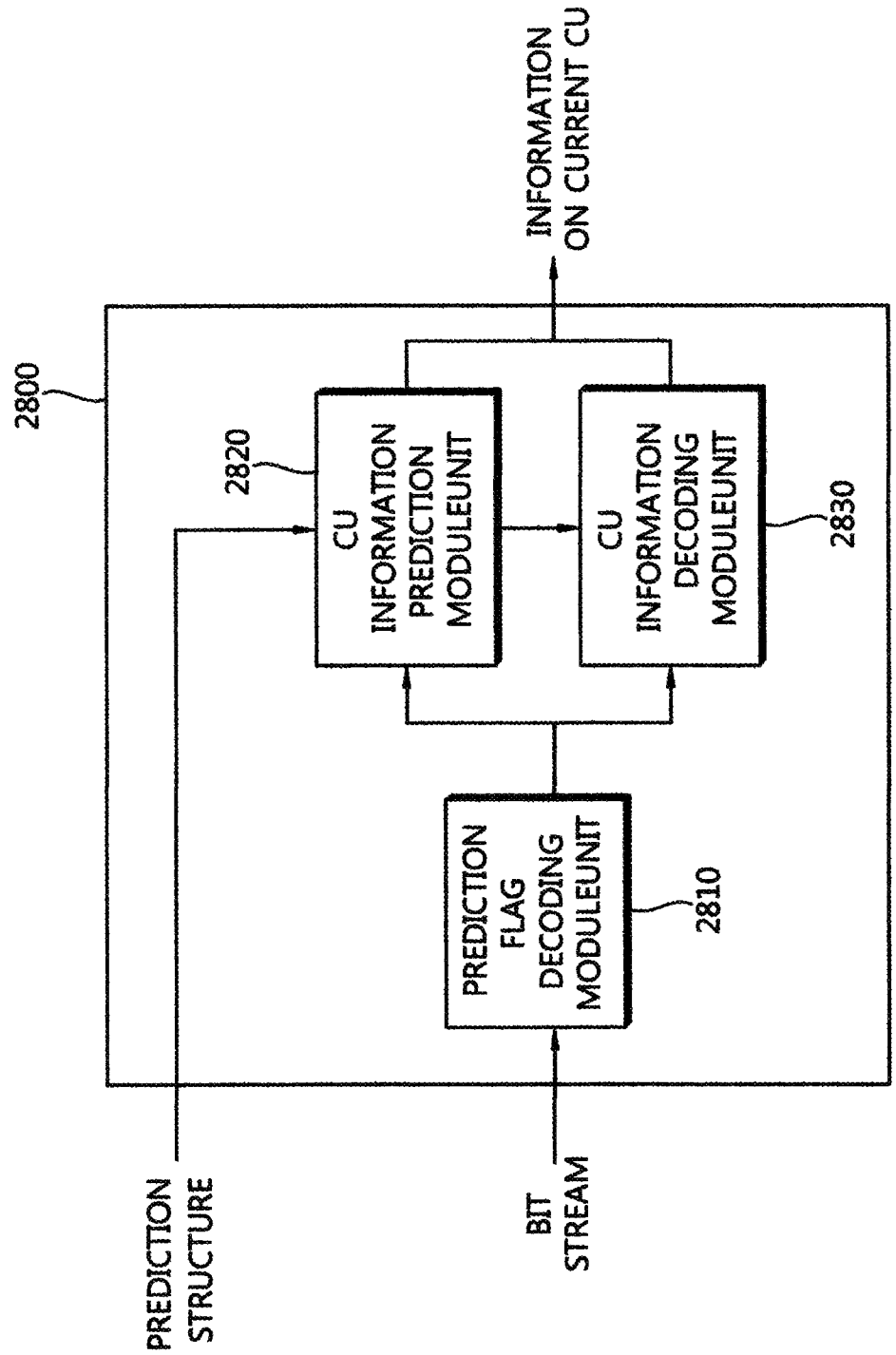
FIG. 28 is a diagram schematically showing a configuration of the coder for predicting and decoding the information on the current CU through the prediction structure according to the embodiment of the present invention.

FIG. 28 is a diagram schematically showing a configuration of the coder for predicting and decoding the information on the current CU through the prediction structure according to the embodiment of the present invention.

Referring to FIG. 28, a decoder 2800 includes a prediction flag decoding module 2810, a CU information prediction module 2820, and a CU information decoding module 2830.

When the bitstream is transmitted, the prediction flag decoding module 2810 decodes the prediction flag information.

The CU information prediction module 2820 predicts the information on the current CU through the prediction structure. Here, the prediction structure used for the prediction is as described in FIG. 6 and FIG. 19.

When the value of the decoded prediction flag information is '1', the information on the CU predicted through the prediction structure is stored as the information on the current CU.

When the value of the decoded prediction flag information is '0', the CU information decoding module 2830 decodes the information on the coded CU transmitted within the bitstream and is stored as the information on the current CU. In this case, the CU information decoding module 2830 may decode the information on the current CU by using the CU information predicted in the CU information prediction module 2820.

In the above-mentioned exemplary system, although the methods have described based on a flow chart as a series of steps or blocks, the present invention is not limited to a sequence of steps but any step may be generated in a different sequence or simultaneously from or with other steps as described above. Further, it may be appreciated by those skilled in the art that steps shown in a flow chart is non-exclusive and therefore, include other steps or deletes one or more steps of a flow chart without having an effect on the scope of the present invention.

The above-mentioned embodiments include examples of various aspects. Although all possible combinations showing various aspects are not described, it may be appreciated by those skilled in the art that other combinations may be made. Therefore, the present invention should be construed as including all other substitutions, alterations and modifications belong to the following claims.

The invention claimed is:

1. A method of decoding video information, the method comprising:

generating an occurrence probability of a split flag for a current coding unit by using a split depth value for a neighboring coding unit, the neighboring coding unit being at least one of coding units located at a top side and a left side of the current coding unit, the split depth value for the neighboring coding unit being determined based on a split flag for the neighboring coding unit, wherein the split flag indicates whether a coding unit is split and the split depth value indicates a depth level of a coding unit according to the split flag, wherein the coding unit is not split when the split flag is equal to 0, and the coding unit is split into four coding units with half horizontal and vertical size of the coding unit when the split flag is equal to 1, and in response to the split flag being equal to 1 and the split depth value of the coding unit being k, each of the four coding units has the split depth value equal to (k+1), the split depth value equal to (k+1) being less than or equal to a maximum depth value that is signaled from a bitstream;

performing entropy decoding of the split flag on the current coding unit according to the generated occurrence probability;

decoding a prediction flag indicating whether information of the current coding unit is the same as prediction information derived from information of one of neighboring blocks including a collocated block of the current coding unit, the collocated block belonging to a reference frame, the reference frame having a different temporal order from a current frame to which the current coding unit belongs;

wherein, when the information of the current coding unit is the same as prediction information derived from information of the collocated block, a first reference index and a second reference index are determined to be a predetermined constant value based on whether two lists of reference frames are used for the current coding unit, wherein the current coding unit is decoded based on a first frame and a second frame, wherein the first frame is determined by the first reference index and a first list of reference frames, wherein the second frame is determined by the second reference index and a second list of reference frames, and wherein the predetermined constant value is set before decoding the video information.

2. A method of encoding video information, the method comprising:

generating an occurrence probability of a split flag for a current coding unit by using a split depth value for a neighboring coding unit, the neighboring coding unit being at least one of coding units located at a top side and a left side of the current coding unit, the split depth value for the neighboring coding unit being determined based on whether the neighboring coding unit is split or not, wherein the split flag indicates whether a coding unit is split and the split depth value indicates a depth level of a coding unit according to the split flag, wherein the coding unit is not split when the split flag is equal to 0, and the coding unit is split into four coding units with half horizontal and vertical size of the coding unit when the split flag is equal to 1, and in response to the split flag being equal to 1 and the split depth value of the coding unit being k, each of the four coding units has the split depth value equal to (k+1), the split depth value equal to (k+1) being less than or equal to a predetermined maximum depth value;

performing entropy encoding of the split flag on the current coding unit according to the generated occurrence probability;

encoding a prediction flag indicating whether information of the current coding unit is the same as prediction information derived from information of one of neighboring blocks including a collocated block of the current coding unit, the collocated block belonging to a reference frame, the reference frame having a different temporal order from a current frame to which the current coding unit belongs;

wherein, when the information of the current coding unit is the same as prediction information derived from information of the collocated block, a first reference index and a second reference index are determined to be a predetermined constant value based on whether two lists of reference frames are used for the current coding unit, wherein the current coding unit is encoded based on a first frame and a second frame, wherein the first frame is determined by the first reference index and a first list of reference frames, wherein the second frame is determined by the second reference index and a second list of reference frames, and wherein the predetermined constant value is set before encoding the video information.

3. A non-transitory computer-readable recording medium storing a bitstream generated by a method of encoding video information, the method comprising:

generating an occurrence probability of a split flag for a current coding unit by using a split depth value for a neighboring coding unit, the neighboring coding unit being at least one of coding units located at a top side and a left side of the current coding unit, the split depth value for the neighboring coding unit being determined based on whether the neighboring coding unit is split or not, wherein the split flag indicates whether a coding unit is split and the split depth value indicates a depth level of a coding unit according to the split flag, wherein the coding unit is not split when the split flag is equal to 0, and the coding unit is split into four coding units with half horizontal and vertical size of the coding unit when the split flag is equal to 1, and in response to the split flag being equal to 1 and the split depth value of the coding unit being k, each of the four coding units has the split depth value equal to (k+1), the split depth value equal to (k+1) being less than or equal to a predetermined maximum depth value;

performing entropy encoding of the split flag on the current coding unit according to the generated occurrence probability;

encoding a prediction flag indicating whether information of the current coding unit is the same as prediction information derived from information of one of neighboring blocks including a collocated block of the current coding unit, the collocated block belonging to a reference frame, the reference frame having a different temporal order from a current frame to which the current coding unit belongs;

wherein, when the information of the current coding unit is the same as prediction information derived from information of the collocated block, a first reference index and a second reference index are determined to be a predetermined constant value based on whether two lists of reference frames are used for the current coding unit, wherein the current coding unit is encoded based on a first frame and a second frame, wherein the first frame is determined by the first reference index and a first list of reference frames, wherein the second frame is determined by the second reference index and a second list of reference frames, and wherein the predetermined constant value is set before encoding the video information.

* * * * *